(12) United States Patent
Anderson et al.

(10) Patent No.: US 10,150,149 B2
(45) Date of Patent: Dec. 11, 2018

(54) SYSTEMS AND METHODS FOR MAKING PANELS FROM SHEET MATERIAL USING ADAPTIVE CONTROL

(71) Applicant: M.I.C. Industries, Inc., Reston, VA (US)

(72) Inventors: Todd E. Anderson, Duncansville, PA (US); Frederick Morello, Johnstown, PA (US)

(73) Assignee: M.I.C. Industries, Inc., Reston, VA (US)

( * ) Notice: Subject to any disclaimer, the term of this patent is extended or adjusted under 35 U.S.C. 154(b) by 734 days.

(21) Appl. No.: 14/253,447

(22) Filed: Apr. 15, 2014

(65) Prior Publication Data

US 2015/0081082 A1    Mar. 19, 2015

Related U.S. Application Data

(63) Continuation of application No. 13/159,752, filed on Jun. 14, 2011, now abandoned.

(51) Int. Cl.
*G06F 19/00* (2018.01)
*B21C 31/00* (2006.01)
(Continued)

(52) U.S. Cl.
CPC ............... *B21C 31/00* (2013.01); *B21D 5/08* (2013.01); *G05B 15/02* (2013.01)

(58) Field of Classification Search
USPC ....................................................... 700/127
See application file for complete search history.

(56) References Cited

U.S. PATENT DOCUMENTS 3,902,288 A    9/1975  Knudson
4,206,625 A *  6/1980  Vegh .................. B21D 5/08
                                                72/181
(Continued)

FOREIGN PATENT DOCUMENTS

JP    S63-041309    2/1988
JP    H11-020297    1/1999
(Continued)

OTHER PUBLICATIONS

International Search Report for PCT/US12/42207 dated Sep. 13, 2012.
(Continued)

*Primary Examiner* — Kidest Bahta
(74) *Attorney, Agent, or Firm* — Jones Day

(57) ABSTRACT

A system for forming a building panel of a desired shape includes a shaping machine comprising multiple rollers, wherein the shaping machine is configured to provide a desired shape to a building panel, and wherein the building panel is made from sheet material. A drive system moves the building panel longitudinally along the shaping machine, and a power source provides power to the drive system. As the building panel is moved along the shaping machine, a load sensor detects a load placed on the power source, and an optional speed sensor detects a speed of the building panel. A control system controls the drive system in response to a signal from the load sensor so as to control the load on the power source as the building panel moves along the shaping machine.

21 Claims, 21 Drawing Sheets

(51) Int. Cl.
  *B21D 5/08*   (2006.01)
  *G05B 15/02*  (2006.01)

(56) References Cited

U.S. PATENT DOCUMENTS

| | | | |
|---|---|---|---|
| 4,364,253 | A | 12/1982 | Kundson |
| 4,660,399 | A * | 4/1987 | Suter ..................... B21D 5/08 72/129 |
| 5,249,445 | A | 10/1993 | Morello |
| 5,461,893 | A * | 10/1995 | Tyler ..................... B21D 5/042 72/10.1 |
| 5,466,317 | A | 11/1995 | Lause et al. |
| 5,743,056 | A | 4/1998 | Balla-Goddard et al. |
| 5,758,707 | A * | 6/1998 | Jung ..................... C22C 1/005 164/113 |
| 5,819,574 | A | 10/1998 | Yogo |
| 5,961,899 | A | 10/1999 | Rossetti et al. |
| 6,722,087 | B1 | 4/2004 | Morello |
| 8,516,772 | B2 | 8/2013 | Cai |
| 8,727,346 | B2 | 5/2014 | Chiari et al. |
| 2003/0000156 | A1 | 1/2003 | Morello et al. |
| 2003/0164021 | A1 | 9/2003 | Gordon et al. |
| 2005/0115299 | A1 | 6/2005 | Jaaskelainen et al. |
| 2006/0260377 | A1 * | 11/2006 | Kane ..................... B21D 5/08 72/307 |
| 2007/0271870 | A1 * | 11/2007 | Mifsud ................. B21F 27/128 52/745.2 |
| 2009/0267264 | A1 | 10/2009 | Tranter et al. |
| 2010/0146789 | A1 | 6/2010 | Anderson et al. |

FOREIGN PATENT DOCUMENTS

| | | |
|---|---|---|
| JP | 2003-305517 | 10/2003 |
| JP | 2004-344810 | 12/2004 |
| TW | 201029909 | 8/2010 |
| WO | WO 91/07293 | 5/1991 |
| WO | 2008/053678 | 5/2008 |

OTHER PUBLICATIONS

International Written Opinion for PCT/US12/42207 dated Sep. 13, 2012.

Official Action dated Jul. 22, 2016 in corresponding Taiwan Application No. 101120942 (with English translation).

Official Action dated May 17, 2016 in corresponding Japan Application No. 2014-515942 (with partial English translation).

* cited by examiner

FIG. 8 (Top View)

FIG. 9 (Top View)

FIG. 10 (Top View)

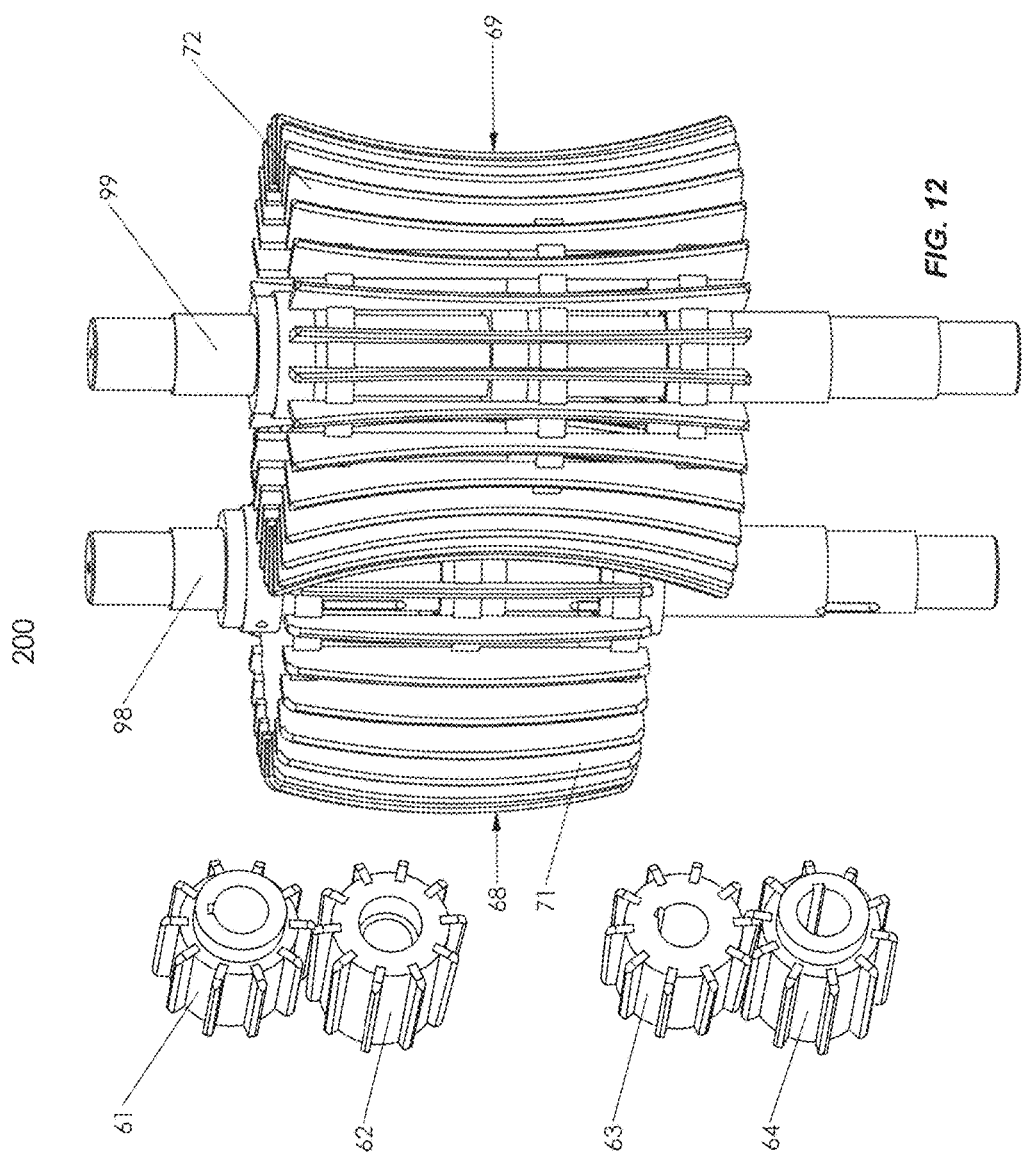

SYSTEMS AND METHODS FOR MAKING PANELS FROM SHEET MATERIAL USING ADAPTIVE CONTROL

This application is a continuation of U.S. patent application Ser. No. 13/159,752, filed Jun. 14, 2011, the entire contents of which are incorporated herein by reference.

BACKGROUND

Field of the Disclosure

The present disclosure relates to systems and methods for making building panels from sheet materials, e.g., galvanized steel sheet metal, of desired shapes.

Background Information

Methods and machines are known in the art for forming building panels of desired shapes made from sheet material, e.g., galvanized steel sheet metal. Such building panels can be attached side-by-side to form self-supporting building structures by virtue of the strength of the building panels themselves. That is, such building panels can exhibit a moment of inertia suitable to provide enough strength under applied loads (e.g., snow, wind, etc.) so that supporting beams or columns within the building structure are unnecessary. In other words, the building panels themselves may form load-bearing wall panels and roof panels of a self-supporting building without the need for supporting beams or columns. FIGS. 1-3 illustrate exemplary shapes of self-supporting metal buildings. These exemplary building shapes include double-radius (or two-radius) style buildings, an example of which is shown in FIG. 1, gable style buildings, an example of which is shown in FIG. 2, and circular or arch style buildings, an example of which is shown in the example of FIG. 3. In the exemplary buildings illustrated in FIGS. 1-3, longitudinally curved building panels are used to form the side and roof sections, and substantially straight building panels or other materials are used to construct the flat end-wall sections.

As is known in the art, building panels of a desired cross-sectional shape may be formed from steel sheet metal using a panel forming apparatus having particular configurations of steel rollers. Flat sheet metal is introduced into the panel forming apparatus, and the rollers contact and deform the sheet metal as it passes through the panel forming apparatus, such that the building panel emerges with a desired cross sectional shape.

The resulting building panel, having been shaped in cross section, can then be curved (arched) in the longitudinal direction (perpendicular to the transverse, cross-sectional direction) using a panel curving apparatus. One type of curving apparatus utilizes rollers having crimping blades that indent the building panel to impart transverse corrugations (or cross corrugations) of suitable depths into the panel as the building panel passes through the apparatus, so as to provide the longitudinal curve to the building panel. Exemplary crimping machines of this type are disclosed in U.S. Pat. Nos. 3,902,288, 4,364,253 and 6,722,087, and U.S. Patent Application Publication No. 2003/0000156, the entire contents of each of which are incorporated herein by reference.

U.S. Patent Application Publication No. 2010/0146789 discloses another type of curving apparatus that is configured with particularly placed rollers to provide a longitudinal curve (arch) to a building panel without imparting transverse corrugations to the panel. The entire contents of U.S. Patent Application Publication No. 2010/0146789 are incorporated herein by reference.

Building panels that have been shaped in cross section and curved to a desired extent can then be attached together side-by-side to form self supporting buildings such as illustrated in FIGS. 1-3.

The present inventors have observed that suitable operating parameters of panel forming and panel curving apparatuses, such as the speed at which a building panel can be formed or curved, can depend on the thickness of the steel sheet being processed and on environmental conditions, such as temperature and humidity. In addition, the power source typically has limited power output and an optimum operating point. The present inventors have determined that it would be beneficial to provide panel shaping machines, such as panel forming apparatuses and panel curving apparatuses, with suitable automated control of certain operating parameters to optimize production of panels despite variations in sheet metal properties and environmental conditions, and to prevent overloading and stalling of the power sources for such apparatuses.

SUMMARY

According to one example, a system for shaping a building panel of a desired shape is disclosed. The system comprises a shaping machine comprising multiple rollers, the shaping machine configured to provide a desired shape to a building panel, the building panel being made from sheet material; a drive system for moving the building panel longitudinally along the shaping machine; a power source for providing power to the drive system; a load sensor for detecting a load placed on the power source as the building panel is moved along the shaping machine; and a control system for controlling the drive system in response to a signal from the load sensor so as to control the load placed on the power source as the building panel moves along the shaping machine.

According to another example, a method for shaping a building panel of a desired shape is disclosed. The method comprises providing power to a drive system using a power source; moving a building panel longitudinally through a shaping machine using the drive system, the shaping machine comprising multiple rollers, the building panel being made from sheet material, the shaping machine configured to provide a desired shape to the building panel; detecting a load placed on the power source with a load sensor as the building panel moves along the shaping machine; controlling the drive system in response to a signal from the load sensor so as to control the load placed on the power source as the building panel moves along the shaping system.

According to another example, a system for shaping a building panel of a desired shape is disclosed. The system comprises power means for providing power to the system; drive means for moving a building panel longitudinally through the system; shaping means for shaping the building panel so as to have a desired shape, the building panel being made from sheet material; detecting means for detecting a load placed on the power means as the building panel moves along the shaping means; and control means for controlling the drive means in response to a signal from the detecting means so as to control the load placed on the power means as the building panel moves along the shaping means.

According to another example, a method for controlling a system for shaping a building panel of a desired shape is disclosed. The method comprises receiving a signal from a load sensor that detects a load placed on a power source, the power source configured provide power to a drive system, the drive system configured to move a building panel longitudinally along a shaping machine, the building panel being made from sheet material, the shaping machine configured to provide a desired shape to the building panel; processing the signal from the load sensor; and controlling the drive system based on said processing to control the load placed on the power source as the building panel moves along the shaping machine.

According to another example, a system for shaping a building panel of a desired shape is disclosed. The system comprises receiving means for receiving a signal indicative of a load placed on a power means that provides power to drive means for moving the panel along shaping means for providing a desired shape to the building panel; processing means for processing the signal; and control means for controlling the drive means based on said processing to control the load placed on the power means as the building panel moves along the shaping means.

According to another example, a control system for controlling a system for shaping a building panel of a desired shape is disclosed. The control system comprises a processing system and a memory coupled to the processing system. The processing system is configured to execute steps comprising receiving a first signal from a load sensor that detects a load placed on a power source, the power source configured provide power to a drive system, the drive system configured to move a building panel longitudinally along a shaping machine, the shaping machine configured to provide a desired shape to the building panel; processing the first signal from the load sensor; and controlling the drive system based on said processing so as to control the load placed on the power source as the building panel moves along the shaping machine.

According to another example, an article of manufacture comprising a non-transitory computer-readable medium comprising programming instructions for the control of a system for shaping a building panel of a desired shape is disclosed. The programming instructions, when executed, cause a processing system to carry out steps comprising receiving a first signal from a load sensor that detects a load placed on a power source, the power source configured provide power to a drive system, the drive system configured to move a building panel longitudinally along a shaping machine, the shaping machine configured to provide a desired shape to the building panel; processing the first signal from the load sensor; and controlling the drive system based on said processing so as to control the load placed on the power source as the building panel moves along the shaping machine.

BRIEF DESCRIPTION OF THE DRAWINGS

These and other features, aspects, and advantages of the present disclosure will become better understood with regard to the following description, appended claims, and accompanying drawings.

FIG. 12 illustrates another exemplary panel curving apparatus that utilizes corrugating rollers with crimping blades for imparting transverse corrugations into a building panel to provide a longitudinal curve thereto.

DETAILED DESCRIPTION OF EXEMPLARY EMBODIMENTS

Figure 4:
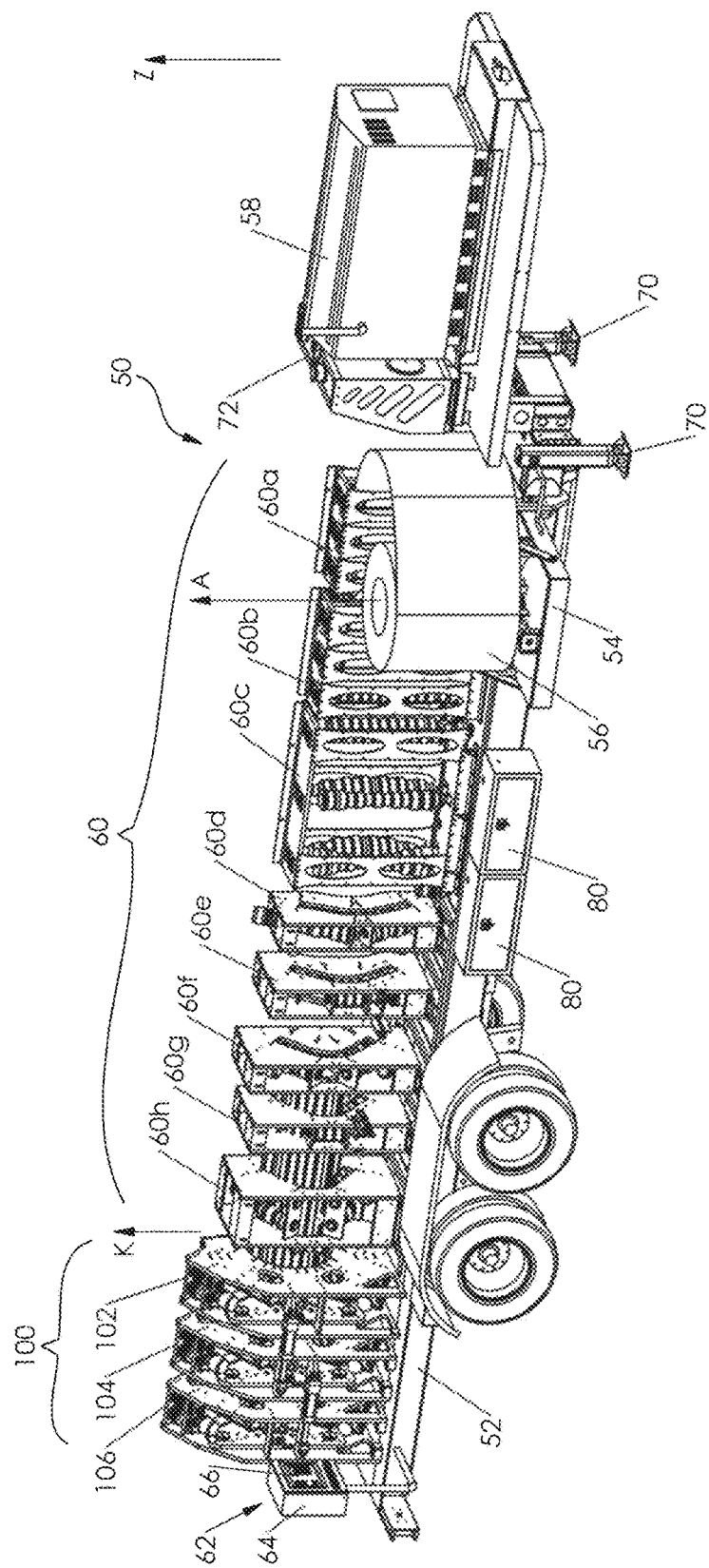
FIG. 4 illustrates an exemplary system for shaping a building panel of a desired shape according to one example.

FIG. 4 illustrates an exemplary system 50 for forming a building panel of a desired shape according to one example. The system 50 includes a support structure 52, shown in this example as a mobile trailer platform that can be towed behind a prime mover, e.g., a truck or tractor, so that the system 50 can be easily transported to a job site. Supported by the support structure 52 is a first panel shaping machine in the form of panel forming apparatus 60 that includes multiple panel forming assemblies 60a-60h, which, in this example, that are configured to generate a building panel that is straight along its length and that has a desired cross sectional shape. The system 50 also includes a second panel shaping machine in the form of panel curving apparatus 100 that includes multiple curving assemblies 102, 104, and 106 for imparting a longitudinal curve to the building panel. The system 50 also includes multiple leveling jacks 70 and multiple equipment storage compartments 80.

Also supported by the support structure 52 is a coil holder 54 (or decoiler) for supporting a coil 56 of sheet material (e.g., steel sheet metal) whose rotational axis A is oriented in the vertical "Z" direction. The coil holder 54 permits the coil 56 to rotate about an axis "A" parallel to the vertical direction "Z" such that the sheet material can be fed into the panel forming apparatus 60. Any suitable coil holder may be used in this regard, such as the exemplary coil holder disclosed in U.S. patent application Ser. No. 12/659,887, the entire contents of which are incorporated herein by reference.

A power source 58, e.g., a diesel engine or a generator with one or more electric motors, is also provided to power the various aspects of the system 50, such as a drive system that drives the panel forming apparatus 60 and the panel curving apparatus 100. The power source 58 should produce adequate power to run the system 50, and the choice of a suitable power rating (e.g., horsepower) is within the purview of one of ordinary skill in the art depending upon the application at hand. For example, to form and curve building panels one to two feet wide of desired shapes from structural steel sheet of about 0.035 inches to 0.080 inches in thickness at a maximum panel speed of 60 feet per minute, the present inventors have found that a 75 horsepower diesel engine operating at governor-controlled speed of about 2500 revolutions per minute (RPM) is satisfactory and provides a good balance between performance and fuel economy. Those skilled in the art will appreciate that many combinations of horsepower and speed could be utilized depending upon the particular requirements at hand. The drive system may include, for example, a hydraulic system 72 and associated hydraulic pumps and hydraulic motors for driving the panel forming apparatus 60 and panel curving apparatus 100. In this regard, the panel forming apparatus 60 and/or the panel curving apparatus 100 can include drive rollers with urethane or other suitable polymer contacting surfaces for gripping and moving the building panel through the system 50, and such drive rollers may also be viewed as part of the drive system. The drive system may also include any suitable combination of hydraulic cylinders, hydraulic motors, hydraulic tubes and hoses, pressure transducers for measuring the pressure of the hydraulic fluid, flow meters for measuring the flow rate of the hydraulic fluid, and shafts, gears, belts, pulleys, etc., for driving the rollers of the panel forming apparatus 60 and the rollers or the panel curving apparatus 100. Alternatively, a mechanical transmission-based drive system could be used instead of a hydraulic drive system. Configurations for hydraulic drive systems and transmission-based drive systems are known to those of skill in the art, and any suitable drive system configuration may be used, the choice of which is within the purview of one of ordinary skill in the art.

Use of a hydraulic-based drive system can be advantageous since hydraulics can be conveniently used to power various equipment of a shaping system such as system 50 through convenient placement of hydraulic motors and valves and through easy routing of hydraulic hoses. A suitable hydraulic system could use either a single pump or a multiple-pump configuration, and each hydraulic pump can have a pressure control unit or flow control unit with associated pressure transducers and flow transducers, which are known to those skilled in the art. These pumps could be either fixed displacement pumps or variable displacement pumps, which are known to those of skill in the art.

Figure 6:
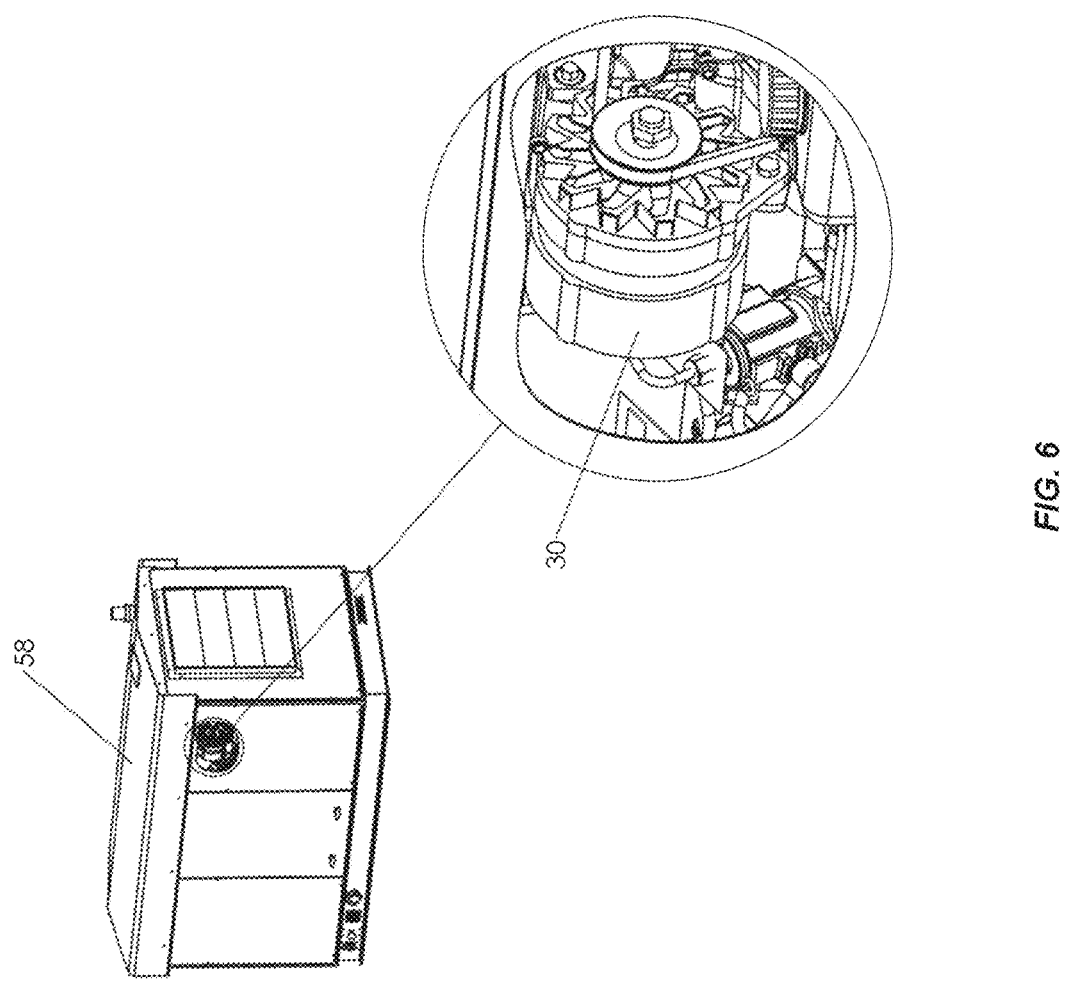
FIG. 6 illustrates an alternator with tachometer output as an exemplary load sensor for detecting a load on an engine in terms of rotational speed.

The system 50 also includes a load sensor 30 for generating a signal indicative of the load placed on the power source 58 during operation of the system 50. As shown in FIG. 6, for example, the load sensor 30 may take the form of an alternator 30, which may have a frequency-to-voltage signal conditioner to provide an alternating high and low signal related to the rotational speed of an engine output shaft. By monitoring the frequency of the pulses from the alternator 30, an accurate indication of the rotational speed of the output shaft of the power source 58 (e.g., diesel engine) is obtained. A rotational speed signal could also be acquired through an inductive or optical sensor monitoring any rotating aspect of the engine or motor. As will be explained in greater detail herein, the purpose of the load sensor is to provide a signal to aid in determining whether the power source is being put under too great a load during an operation of shaping the building panel with a shaping machine (e.g., a panel forming apparatus 60 or a panel curving apparatus 100). If the power source is placed under too great a load, the power source may stall or malfunction, and this is undesirable. Accordingly, as described further herein, the signal from the load sensor 30 can be monitored, and if the load on the power source 58 becomes too great, the drive system can be adjusted to reduce the load on the power source 58.

Where the power source is or includes a motor, such as a diesel engine or an electric motor, the load sensor can be any suitable tachometer or other device (e.g., alternator with suitable electronic decoder such as a frequency-to-voltage signal conditioner) for generating a signal indicative of (e.g., proportional to or correlated to) the rotational speed of a motor shaft. In some instances, e.g., where hydraulics are used for the drive system and where the hydraulic system utilizes fixed displacement hydraulic pumps, a flow meter that monitors the flow rate of hydraulic fluid could be used as a load sensor (instead of or in addition to a tachometer), since in such instances, the flow rate of hydraulic fluid is expected to decrease if excessive loads are placed on the power source. Alternatively, where an electronically controlled engine is used, the load signal (e.g., an electronic signal indicative of the rotational speed of the engine or indicative of power output of the engine) may be obtained directly from the engine control unit (ECU) of the engine which generates such a signal. When the power source is an electric motor the load sensor could alternatively be an ammeter that measures input current to the motor, and the load on the motor can be monitored by measuring that input current. In any of these examples, the load sensor can be considered to measure or provide a signal indicative of a load parameter, which is a parameter indicative of the load placed on the power source. In the examples described above, the load parameter can be, for example, a signal indicative of rotational speed of a motor shaft, a signal indicative of the flow rate of hydraulic fluid, or a signal indicative of the input current to an electric motor. These examples will be discussed further below, but it should be understood that the load sensor and the load parameter are not limited to these example.

Figure 5:
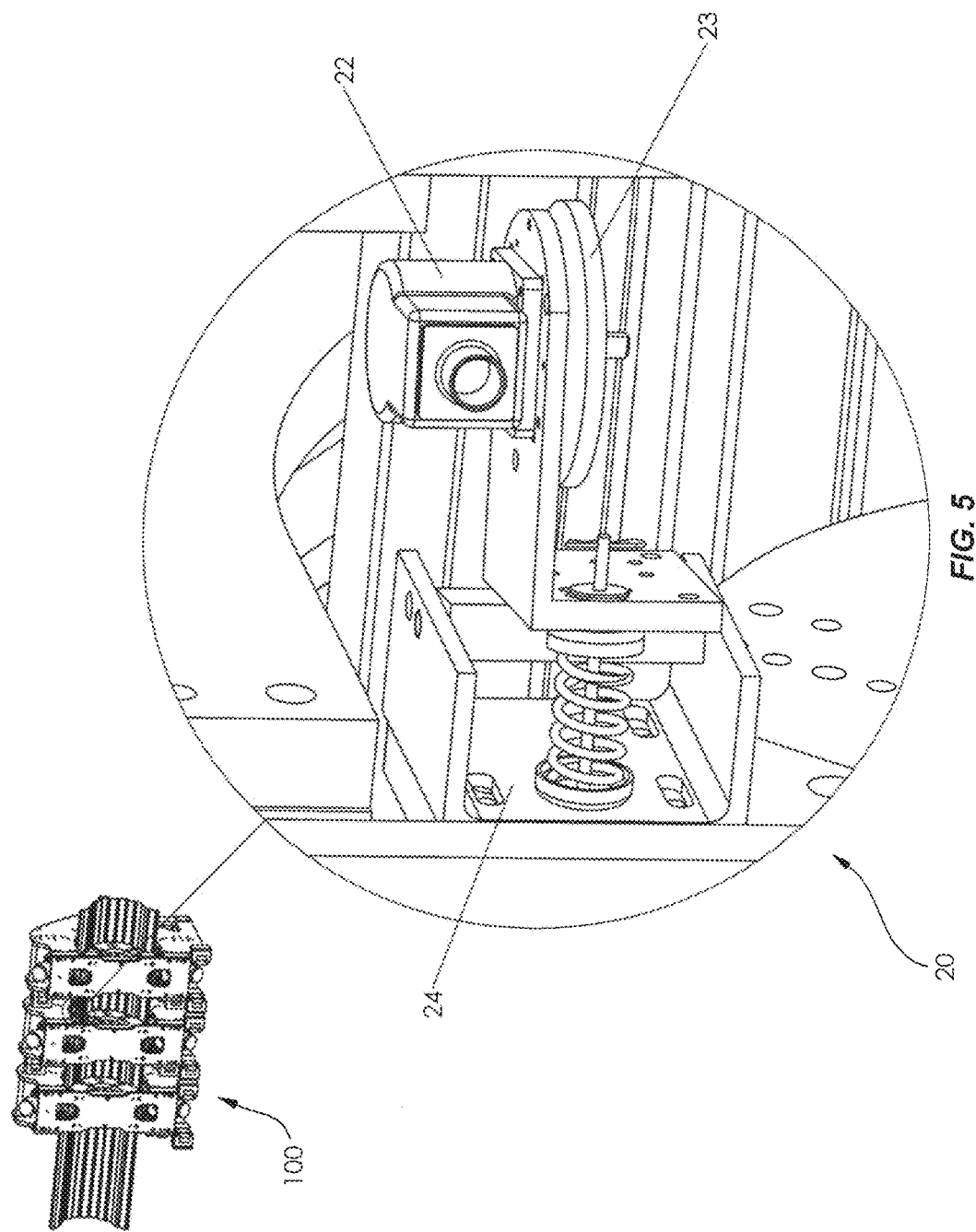
FIG. 5 illustrates an exemplary speed sensor arranged to detect a linear speed at which a building panel moves along a panel shaping machine.

The system 50 also includes a speed sensor 20, such as illustrated, for example, in FIG. 5, for measuring the speed of the building panel as it passes through a shaping machine, such as panel forming apparatus 60 or the panel curving apparatus 100 in the example of FIG. 4. In the example of FIG. 5, the speed sensor 20 includes a measuring wheel 23 that is spring loaded so as to press against a building panel that passes by and that rotates according to the linear speed of the building panel. The speed sensor 20 also includes an encoder 22 that provides a signal indicative of either the linear speed of the building panel or the rotational speed of the measuring wheel, which, in any event, can be correlated to the linear speed of the building panel. The speed sensor 20 can be attached via a mounting bracket 24 to the frame of any suitable component of a shaping machine, e.g., the frame of the panel forming apparatus 50 or the panel curving apparatus 100, such that the measuring wheel 23 is positioned to contact the building panel that passes by. Of course, the speed sensor 20 is not limited to the example illustrated in FIG. 5, and any suitable speed sensor that provides a signal indicative of the linear speed of the building panel (e.g., including a signal that may be correlated to the linear speed of the building panel) as it passes through the shaping machine can be used. As will be explained further herein, the purpose of the speed sensor 20 is to provide a signal indicative of the linear speed of the building panel so as to be able to control the linear speed at which the panel is shaped. In a case where achieving maximum production in a given set of conditions is the goal, the speed sensor 20 could be omitted, and the shaping machine could simply be run at the full capacity of the power source, i.e., under suitable control to avoid overloading and stalling through monitoring the load on the power source 58 by the load sensor 30, e.g., without otherwise monitoring the speed at which the panel moves along the panel shaping machine.

Referring back to FIG. 4, a control system 62 is also provided, such as a microprocessor-based controller 64 (e.g., any suitable computer comprising a processing system and a memory, such as, for instance, a personal computer—PC) and a man-machine interface 66, such as a touch-sensitive display screen, for controlling the operation of the system 50. In particular, as will be described further herein, the control system 62 is configured to control the drive system in response to signals from the load sensor 30 and optionally from the speed sensor 20 so as to control a drive parameter (e.g., hydraulic fluid pressure or flow rate, which can control the speed of a hydraulic drive motor) so as to control a speed at which the building panel moves along the first or second shaping machine (e.g., panel forming apparatus 60 or panel curving apparatus 100), thereby preventing the system 50 from becoming overloaded and stalling.

As shown in the example of FIG. 4, the panel curving apparatus 100 and the panel forming apparatus 60 can be configured to be aligned such that a straight building panel 10 being formed by the panel forming apparatus 60 can be fed directly into the panel curving apparatus 100 to impart the longitudinal curve to form building panel 10a. A shearing apparatus (not shown) can be placed at the exit of panel curving apparatus 100 to shear the building panel 10a at a desired length. Configurations and control of shearing apparatuses are known to those of skill in the art. The panel forming, panel curving, and shearing functions may all be controlled with control system 62.

The basic operation of system 50 illustrated in FIG. 4 is as follows. The power source 58 provides power to the drive system, e.g., such as hydraulic system 72 and associated cylinders, pumps, motors, shafts, gears, belts, pulleys, etc., which then drives various rollers of the panel forming apparatus 60 and panel curving apparatus 100 (exemplary shaping machines). Sheet material such as galvanized steel sheet is fed from coil 56 into the panel forming apparatus 60, which imparts a desired cross sectional shape to the building panel as the building panel moves therethrough. The resulting straight building panel, having been shaped in cross section, passes to the panel curving apparatus 100, which imparts the desired longitudinal curve to the panel. The process is controlled by the control system 62, and certain control aspects to prevent overloading and stalling the power source 58 by controlling the drive system in based on signals from the load sensor will be explained further herein. A human operator can select via the control system whether to produce a longitudinally straight panel, a longitudinally curved panel, a panel with both straight and curved portions, the amount of curvature desired, and the lengths of any straight or curved portions.

Figure 7:
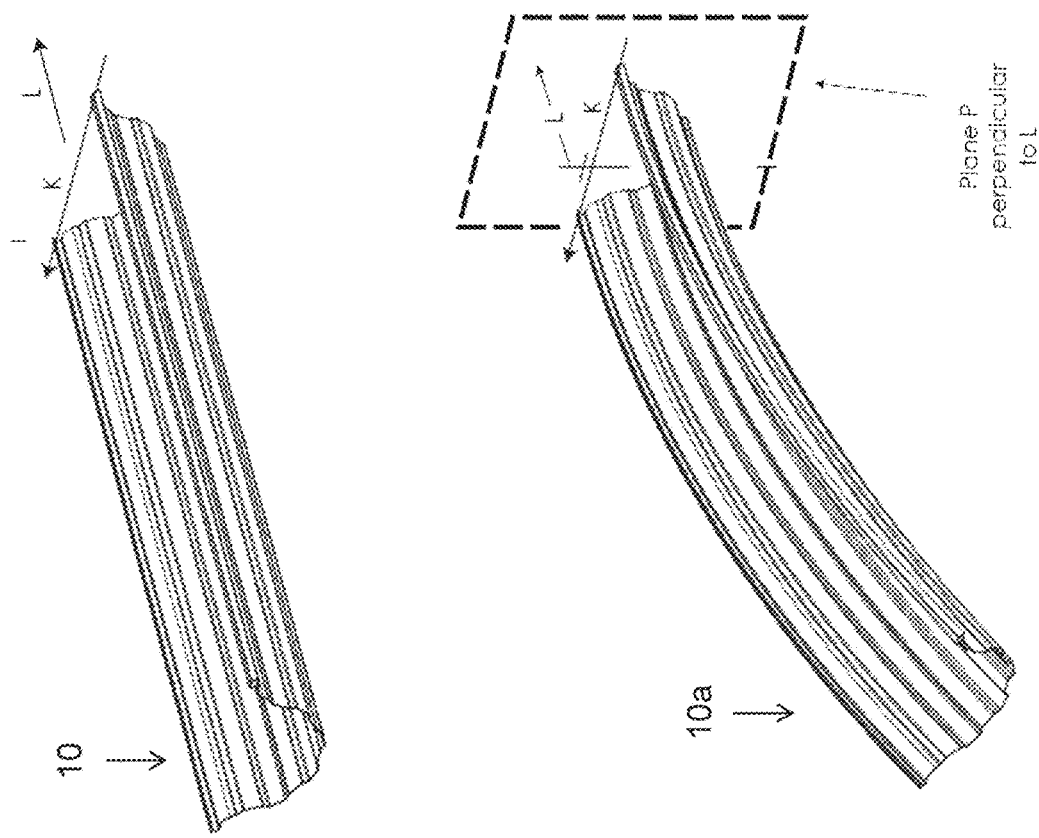
FIG. 7 shows a longitudinally straight building panel (top) and the building panel after curving in the longitudinal direction (bottom).

FIG. 7 shows an example of longitudinally straight building panel 10 and a longitudinally curved building panel 10a, i.e., after building panel 10 has been curved (arched) in the longitudinal direction. The direction K, i.e., a direction from one end of the panel to the other end of the panel in cross section, is also shown, as is a longitudinal direction L of the panel. Referring back to FIG. 4, it can be seen that the direction K of panels 10 and 10a shown in FIG. 7 would be oriented along the vertical direction Z illustrated in FIG. 4. Thus, in the exemplary configuration shown in FIG. 4, the coil holder 54, the panel forming assemblies 60a-60h, and the curving assemblies 102, 104, and 106 are all oriented vertically along direction Z, so that from the time the straight building panel 10 is initially formed by the panel forming apparatus 60 through the time the longitudinally curved building panel 10a exits the panel curving apparatus 100, the direction K of the building panels 10 and 10a will be aligned with the vertical direction Z. Such a configuration results in a "one step" process insofar as a straight building panel 10 does not have to be removed from a panel forming apparatus located at one location and then transported to a panel curving apparatus at another location for longitudinal curving.

The panel forming apparatus 60 and the panel curving apparatus 100 illustrated in FIG. 4 are described in U.S. Patent Application Publication No. 2010/0146789. However, some additional details regarding the panel forming apparatus 60 and the panel curving apparatus 100 will now be briefly described.

Referring to FIG. 4, each panel forming assembly 60a-60h includes a plurality of steel rollers supported by a respective frame, wherein the rollers of each successive panel forming assembly 60a-60h are configured to incrementally impart additional shape to the longitudinally straight building panel that is being formed. Panel forming assemblies are conventionally known in the art, and selection of a particular configurations of rollers and forming assemblies is within the purview of one of ordinary skill in the art depending upon the cross-sectional shape that is desired for the building panel. In particular, for example, the panel forming apparatus 60 may comprise rollers configured to generate a longitudinally straight building panel having a desired cross sectional shape, e.g., such as panel 10 shown in FIG. 7. The panel forming assemblies 60a-60h of panel forming apparatus 60 can be driven by hydraulic motors, for example, powered by power source 58, and can be controlled with control system 62, e.g., a programmable logic controller, using approaches and designs known to those of skill in the art. Approaches for configuring and driving the rollers of a panel forming assembly 60a-60h to achieve a desired cross sectional shape for a building panel are within the purview of those of ordinary skill in the art.

Figure 8:
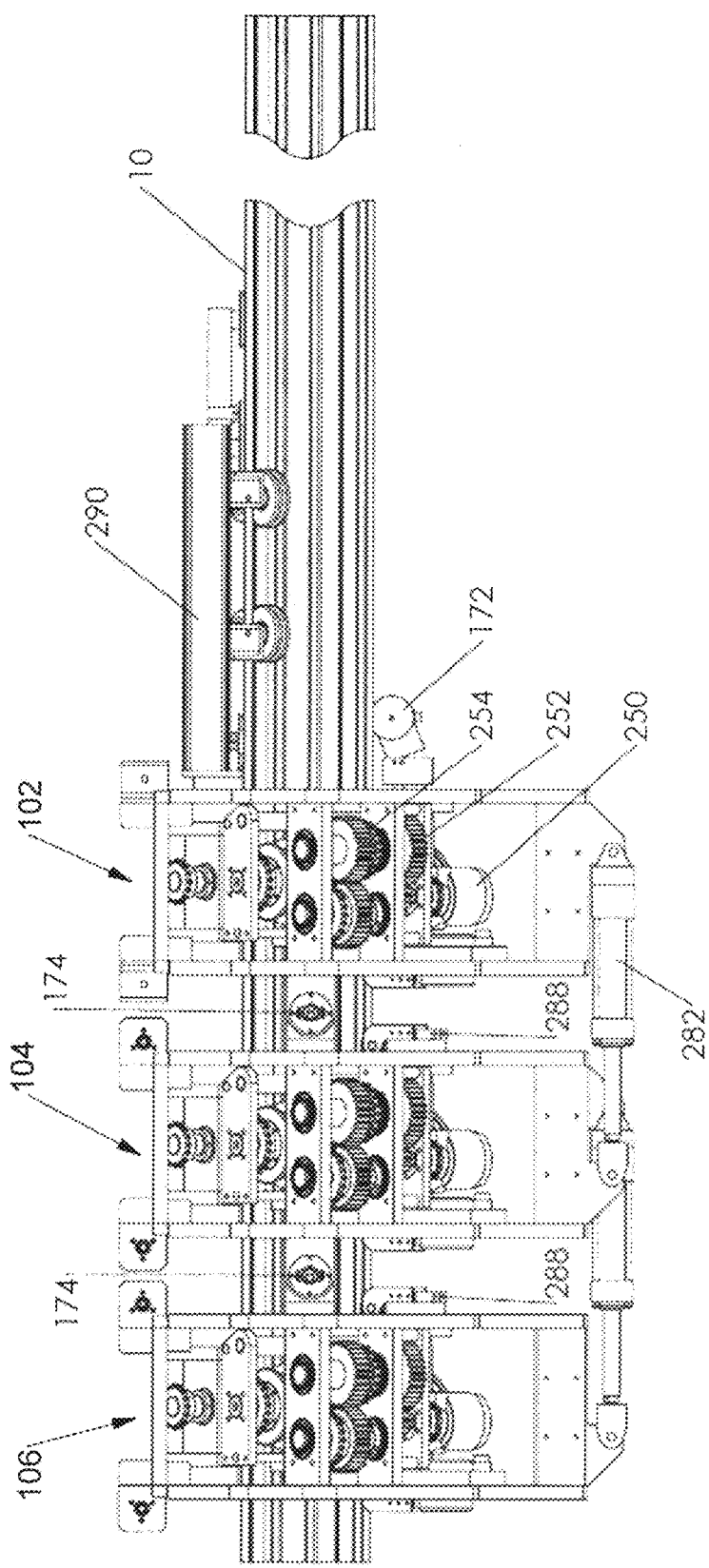
FIG. 8 illustrates a top view of the exemplary panel curving machine of FIG. 4 with a longitudinally straight panel inserted therein according to an exemplary aspect.
Figure 9:
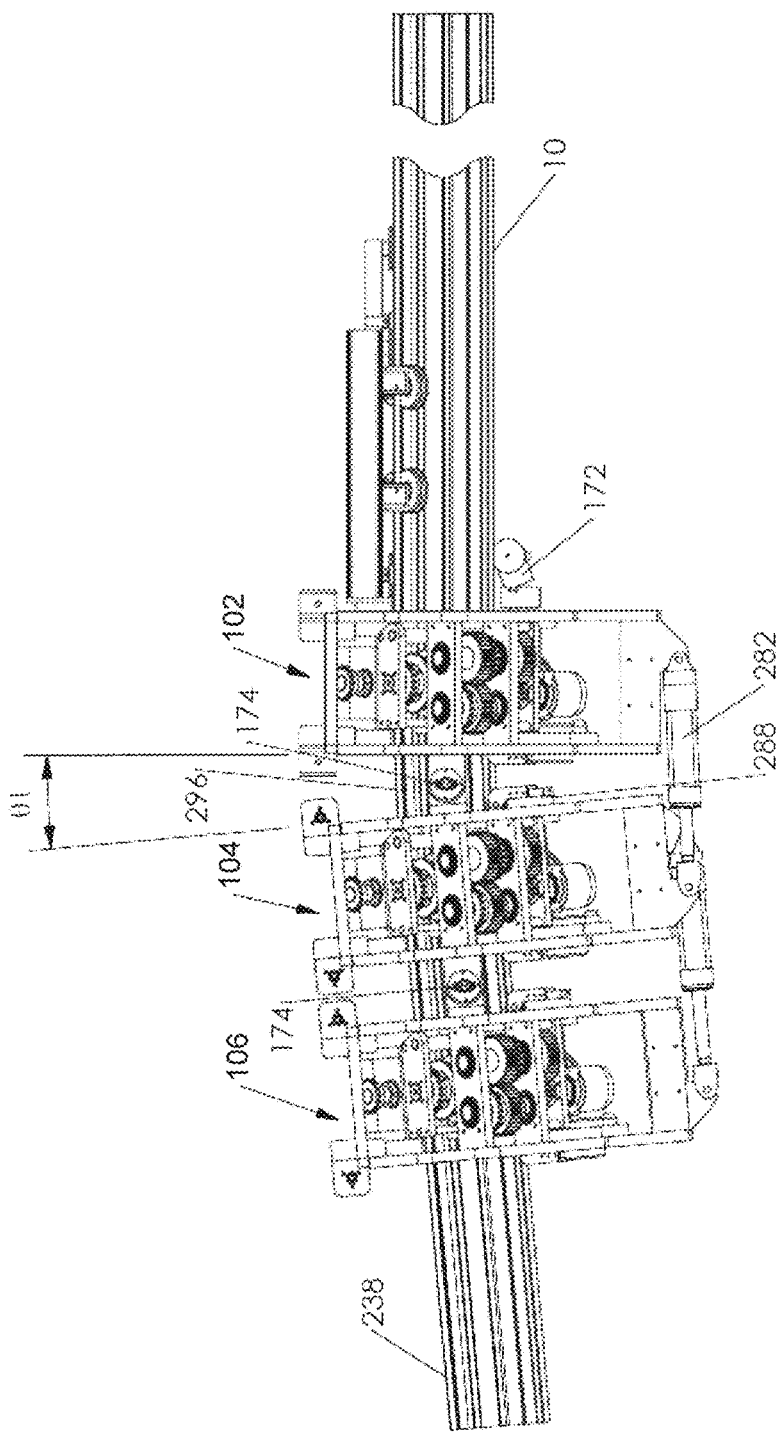
FIG. 9 illustrates another top view of the exemplary panel curving machine of FIG. 4 with the building panel inserted and with relative rotation between first and second panel curving assemblies.
Figure 10:
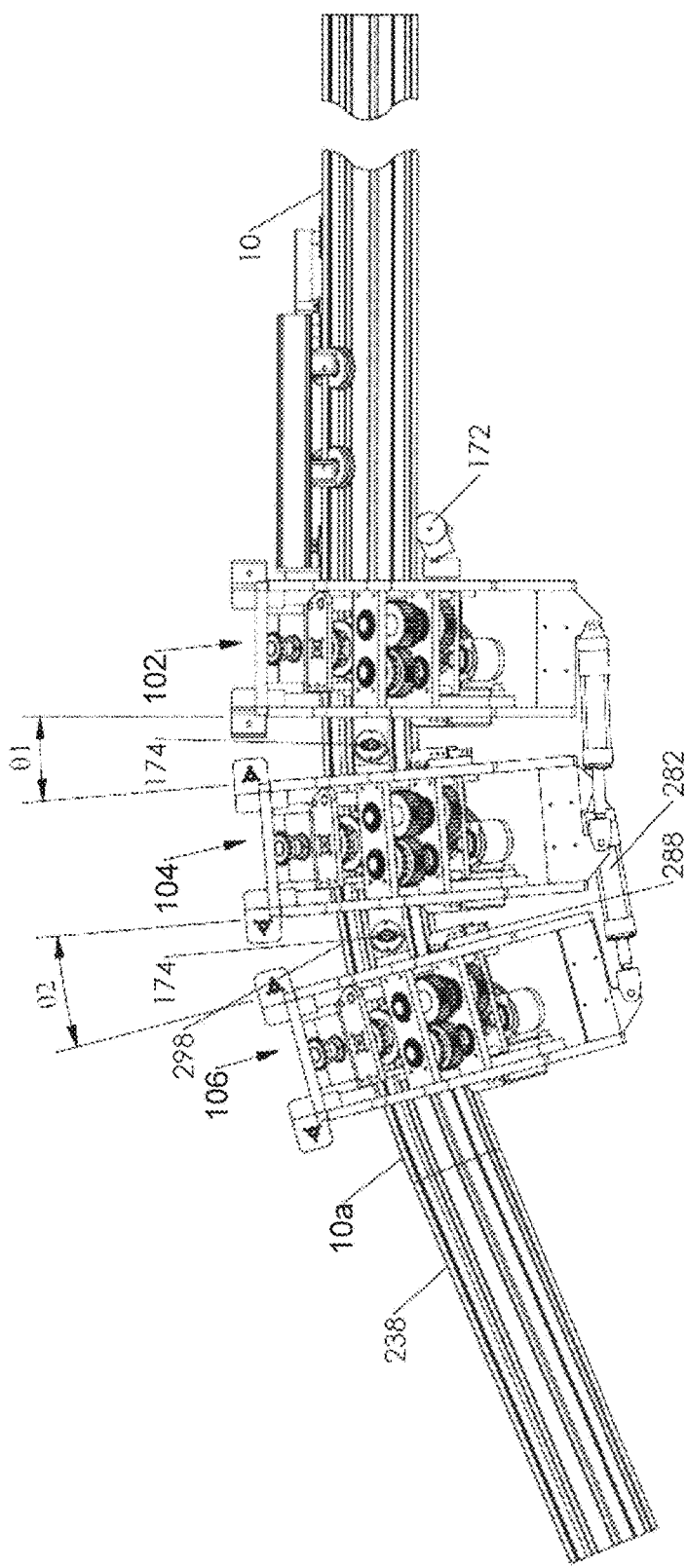
FIG. 10 illustrates another top view of the exemplary panel curving machine of FIG. 4 with the building panel inserted and relative rotation between second and third panel curving assemblies.

The panel curving apparatus 100 includes multiple curving assemblies 102, 104, and 106, each of which includes multiple steel rollers that are positioned and oriented to align with the cross-sectional shape of the building panel 10 to be curved. FIGS. 8-10 show top views of curving assemblies 102, 104, and 106 and an exemplary sequence for imparting a longitudinal curve to a building panel 10. As shown in FIGS. 8-10, curving assemblies 102, 104 and 106 are connected by rotational connections 174 and actuators 282 (e.g., hydraulic cylinders or mechanical actuators).

FIG. 8 shows the panel curving apparatus 100 before any curving of the building panel occurs. A straight building panel 10 is inserted into the entry guide 290 of the panel curving machine 100 (or received directly from an adjacent panel forming apparatus as in FIG. 4). The drive system as described previously moves the building panel 10 into place through all three curving assemblies 102, 104, and 106 without initially imparting any longitudinal curve to the building panel 10. Once the building panel 10 inserted into curving assemblies 102, 104, and 106, the control system 62 can automatically begin translating the building panel 10 longitudinally and begin the curving process.

As shown in FIG. 9, while the building panel 10 is translating longitudinally, the control system 62 causes actuator 282 to rotate curving assembly 104 relative to curving assembly 102 by an angle θ1. Curving assembly 102 is fixed in place. Curving assembly 106 rotates along with curving assembly 104. Sensors, e.g., any suitable optical or electronic position transducer for measuring rotation and/or translation may be used to precisely measure the position of each curving assembly relative to one another. Such sensors may be positioned, for example, at rotational connections 174. As shown in FIG. 9, portion 296 of the building panel 10 is now beginning to curve under the influence of the torque applied to the building panel 10 by the multiple rollers of curving assemblies 102 and 104. The longitudinal curve is imparted as the building panel 10 moves through the panel curving machine 100 without the need for transverse corrugations and without causing buckling.

Next, as shown in FIG. 10, while the building panel 10 is translating longitudinally and when the initially curved portion 296 arrives at curving assembly 106, the control system 62 causes another actuator 282 to rotate curving assembly 106 relative to curving assembly 104 by an angle θ2 that is greater than θ1. Region 298 of the building panel is curved by an additional amount under the influence of the torque applied to the building panel by the multiple rollers of curving assemblies 106 and 104. The approximate angular range for θ1 and θ2 may be from 0° to 30°, for example. According to a non-limiting example, for a 24-inch wide panel made from 0.060 thick steel sheet metal, θ1 may range between 0° and 15°, and θ2 may range between 0° and 30°.

The longitudinal curving process as described above will continue in this manner to produce curved building panels 10 as long as desired. A suitable shearing device (not shown) as known to those of skill in the art can be positioned near the output of curving assembly 106 to shear the building panel 10 at desired lengths for a given building project, and the shearing device can be controlled by the control system 62 as well. A sensor 172 (e.g., like speed sensor 20 described previously) can be used to measure both the linear speed and linear translation of the building panel, and these measurements can be fed to the control system 62 so that the control system 62 can control the curving and shearing process to achieve building panels of desired length and curvature.

Figure 1:
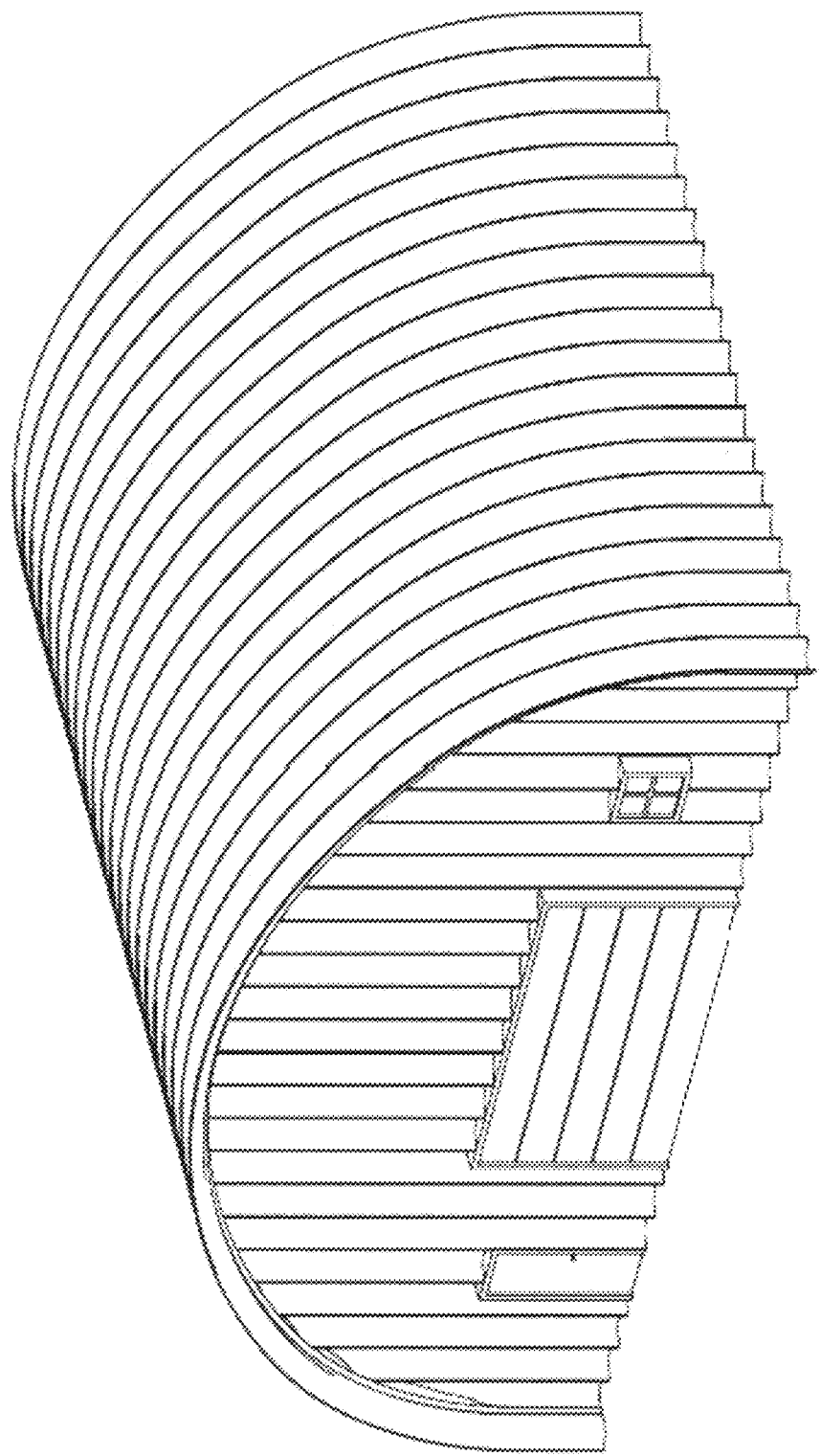
FIG. 1 illustrates an exemplary double-radius (or two-radius) style building that can be formed using building panels formed from sheet material.
Figure 2:
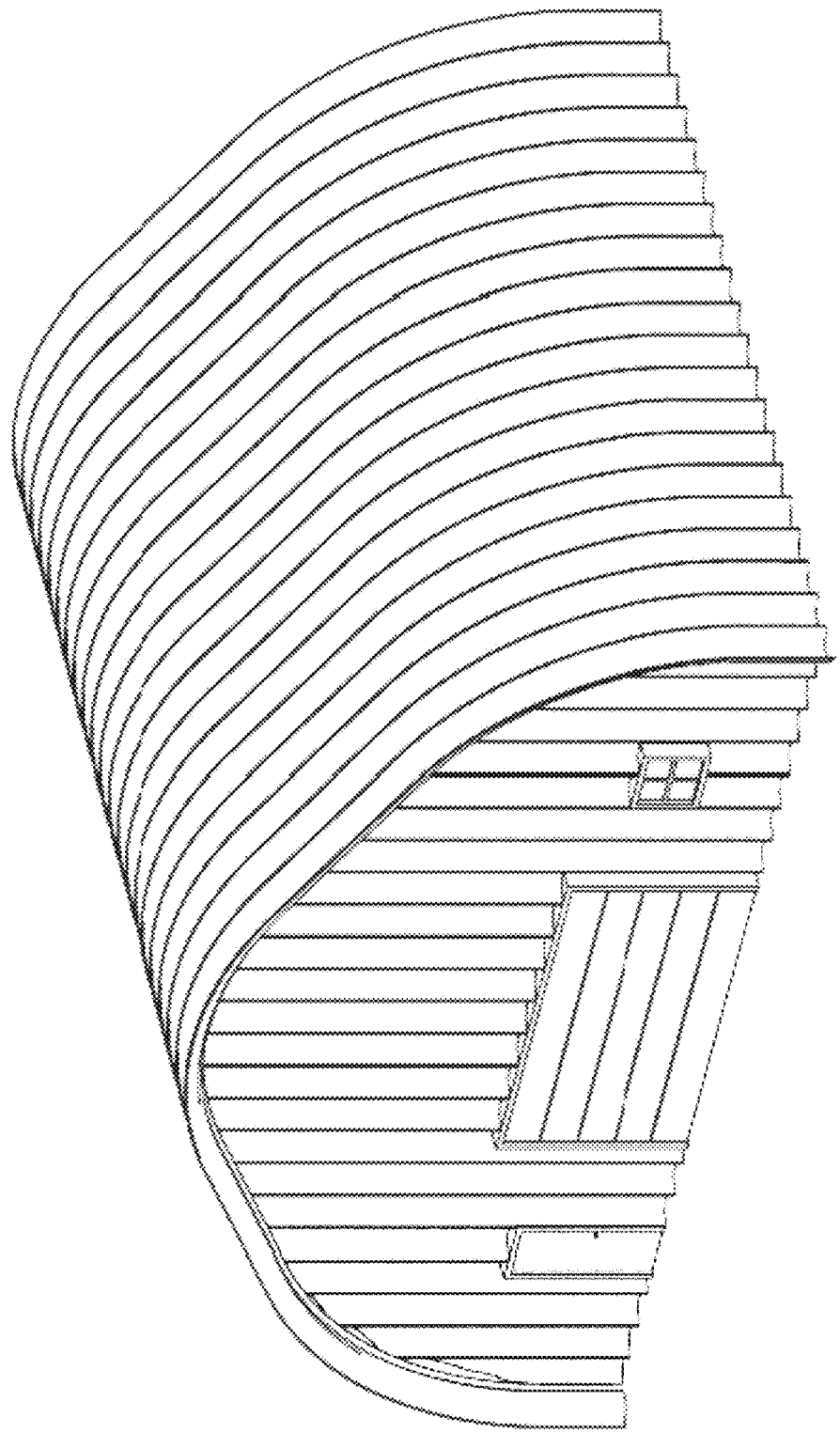
FIG. 2 illustrates an exemplary gable style building that can be formed using building panels formed from sheet material.
Figure 3:
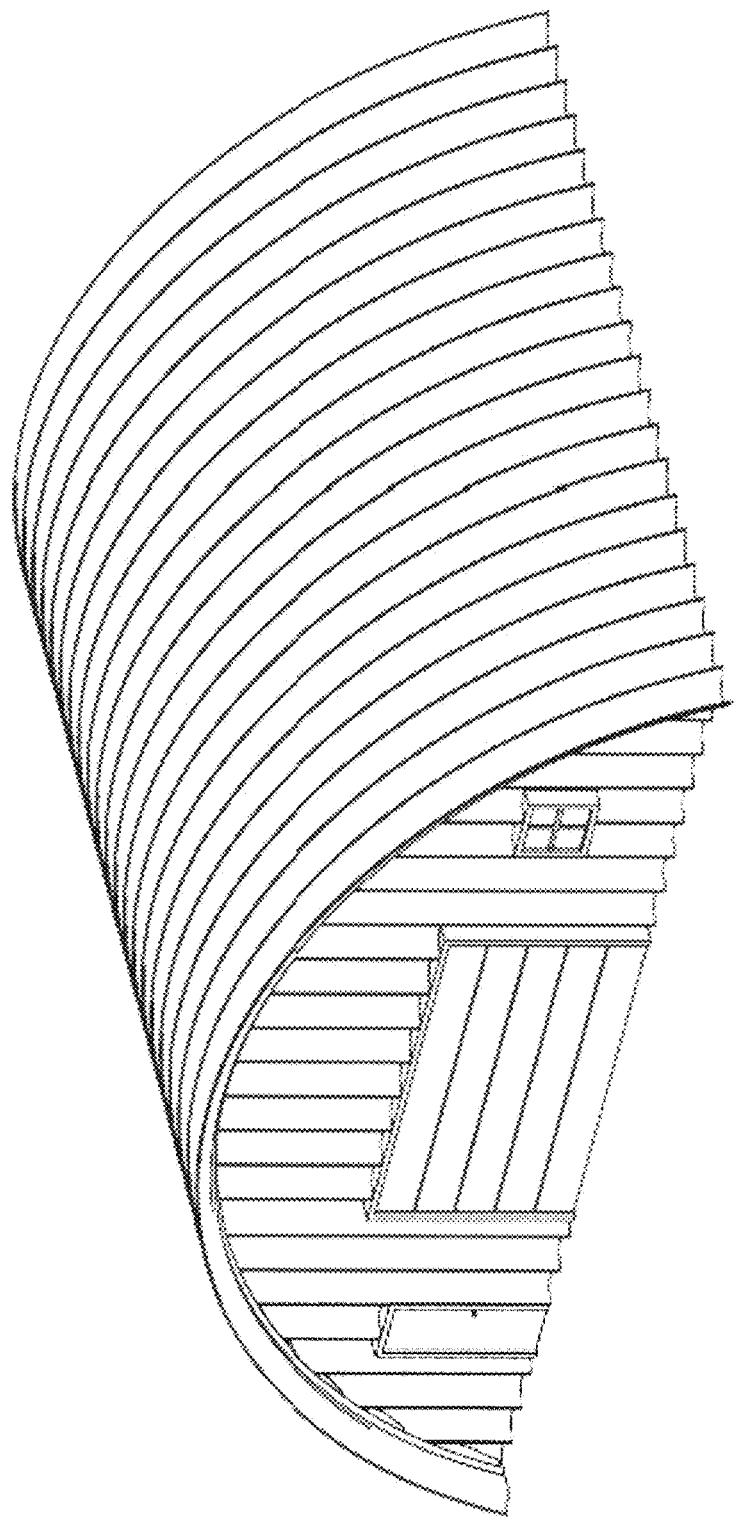
FIG. 3 illustrates an exemplary circular or arch style building that can be formed using building panels formed from sheet material.

As shown in FIG. 10, a portion 238 of the building panel emanating from curving assembly 328 is longitudinally straight because there is a minimal length of the building panel 10 that must be initially inserted into the panel curving apparatus 100 to initiate the curving process as shown in FIG. 8. Such straight portions, which continuously connect with curved portions, are sometimes desirable to provide a straight wall section for a gable style building or a double-radius (two-radius) style building, such as shown in FIGS. 1 and 2. Entirely curved building panels can be used to fabricate the curved portions of arch style buildings such as shown in FIG. 3.

Figure 11:
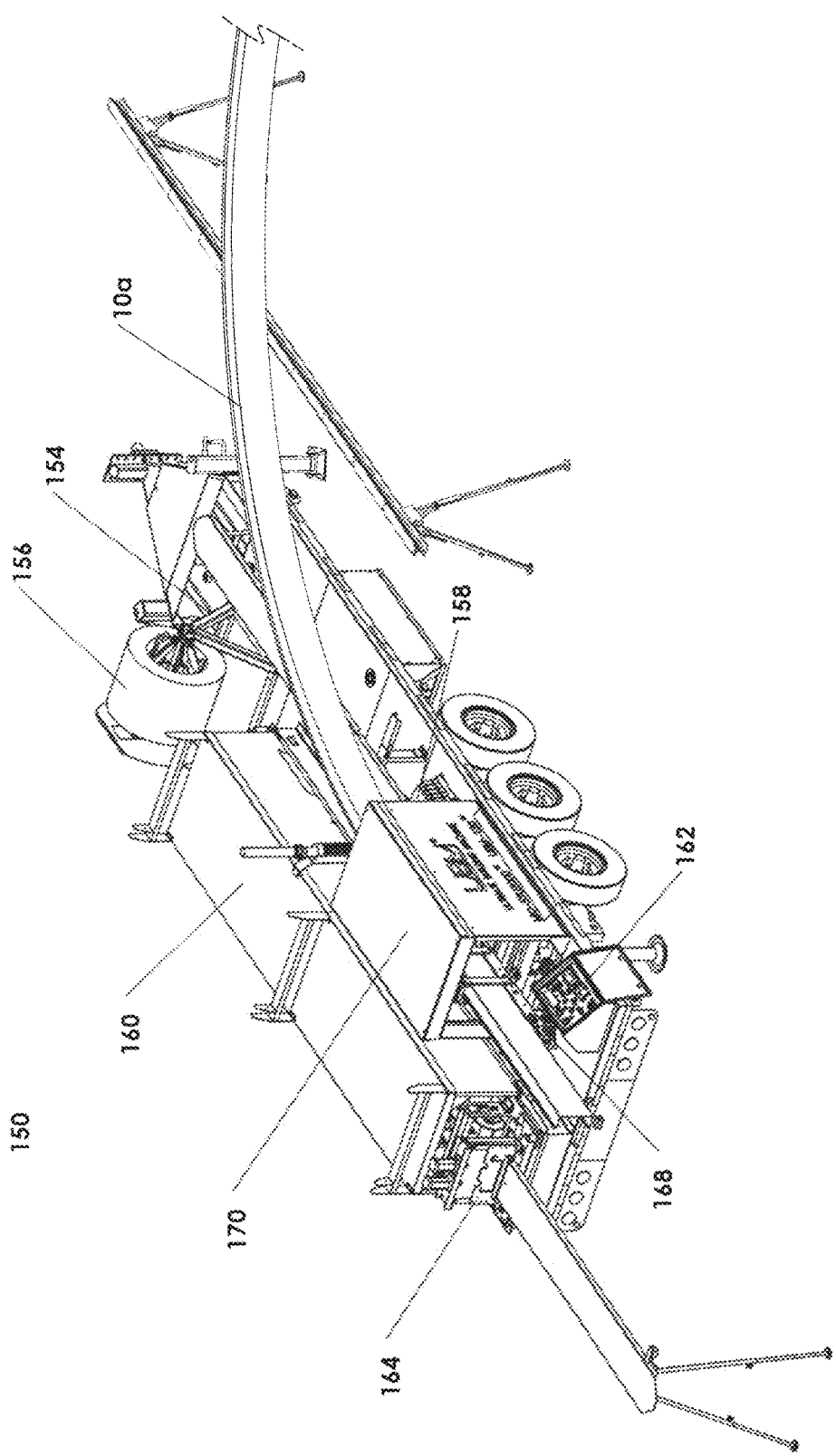
FIG. 11 illustrates another exemplary system for forming a building panel of a desired shape according to another example.

FIG. 11 illustrates another exemplary system 150 for making a building panel of a desired shape according to another example. The system 150 shown in FIG. 11 comprises, among other things, a panel forming apparatus 160, a panel curving apparatus 170, a power source 158 (e.g., a diesel engine, or a generator with one or more electric motors), a drive system including, e.g., a hydraulic system 168, for driving the panel forming apparatus 160 and the panel curving apparatus 170 and for moving the panel through the panel forming apparatus 160 and the panel curving apparatus 170, a control system 162, such a microprocessor based controller (e.g., computer such as a personal computer containing a processing system and a memory), and a coil holder 154 for holding a coil of sheet material 156, such as galvanized steel sheet. The system also comprises a load sensor for detecting a load on the power source 158 and a speed sensor for detecting a linear speed of the building panel, such as previously described above in connection with the example of FIG. 4.

The panel forming apparatus 160 can be configured, for example, like the panel forming apparatus 60 illustrated in FIG. 4 so as to comprise successive panel forming assemblies 60a-60h. Any other suitable configuration of panel forming assemblies could be used, the selection of which is within the purview of one of ordinary skill in the art based on the desired cross sectional shape of the building panel.

In the example of FIG. 11, the panel curving apparatus can be of the type that conventionally utilizes rollers with crimping blades to impart transverse corrugations of suitable depth into the panel to provide the longitudinal curve (arch) to the building panel, such as disclosed, for example, in U.S. Pat. Nos. 3,902,288, 4,364,253 and 6,722,087, and U.S. Patent Application Publication No. 2003/0000156. For example, FIG. 12 shows a schematic configuration of corrugating (crimping) rollers of the type disclosed in U.S. Pat. No. 3,902,288. FIG. 12 shows a curving apparatus 200 comprising a pair of corrugating rollers 61 and 62 for crimping one side portion of a building panel and a pair of corrugating rollers 63 and 64 for crimping the other side portion of the panel, each being supported by respective shafts. The curving apparatus 200 also comprises a pair of corrugating rollers 68 and 69 for corrugating the center portion of the panel. The roller 68 is supported by shaft 98, and the roller 69 is supported by another shaft 99. The roller 68 has a plurality of radially extending circumferentially spaced blades 71, each having a convex profile, and roller 69 has a plurality of radially extending circumferentially spaced blades 72, each having a complementary concave profile. During operation as the rollers 68 and 69 rotate, a convex blade on roller 68 will protrude between two adjacent concave blades on the roller 69 to form the corrugations as the center of the panel passes therethrough. Similarly, the respective blades for side rollers 61 and 62 and rollers 63 and 64 form suitable corrugations in the side portions of the building panel. By imparting the various corrugations into the panel, the curving apparatus 200 provides a longitudinal curve to the panel.

In the example of FIG. 11, the panel forming apparatus 160 and the coil holder 154 are oriented horizontally compared to the orientations illustrated in FIG. 4, but panel forming apparatus 160 and coil holder 154 could be oriented vertically such as shown in FIG. 4, if desired. The coil holder 154 and the panel forming apparatus 160 are located proximate to one another on a common support structure (e.g., mobile trailer platform) in this example, and sheet material from the coil 156 can be fed directly into the panel forming apparatus 160. The panel curving apparatus 170 is located adjacent to the panel forming apparatus 160, but not such that the output of the panel forming apparatus 160 is aligned with the input of the panel curving apparatus 170. Rather, a "two step" process is used in such a configuration, wherein a longitudinally straight building panel 10 can be generated and removed from the panel forming apparatus 160 in a first step, and then, in a second step, the straight building panel 10 can be repositioned fed into a vertically oriented panel curving apparatus 170. A shearing apparatus 164 can be placed at the exit of the panel forming apparatus 160.

Panel shaping machines, such as panel forming apparatuses and panel curving apparatuses such as those illustrated in FIGS. 4 and 11, can be used to make panels from sheet material, such as, for example, structural steel sheet metal ranging from about 0.035 inches to about 0.080 inches in thickness. Such building panels can be formed from other sheet materials as well, such as other types of steel, galvalume, zincalume, aluminum, or other sheet building material that is suitable for construction. FIGS. 13A-13D illustrate some exemplary cross-sectional shapes of building panels that can be formed and/or curved using apparatuses such as those illustrated in FIGS. 4 and 11. The thickness of such building panels may generally range from about 0.035 inches to about 0.080 inches in thickness (±10%), depending on the type of sheet material used. Of course, building panels may be formed using other thicknesses and using other sheet building materials so long as the sheet materials possess suitable engineering properties of strength, toughness, workability, etc., for the project at hand.

Figure 13A:
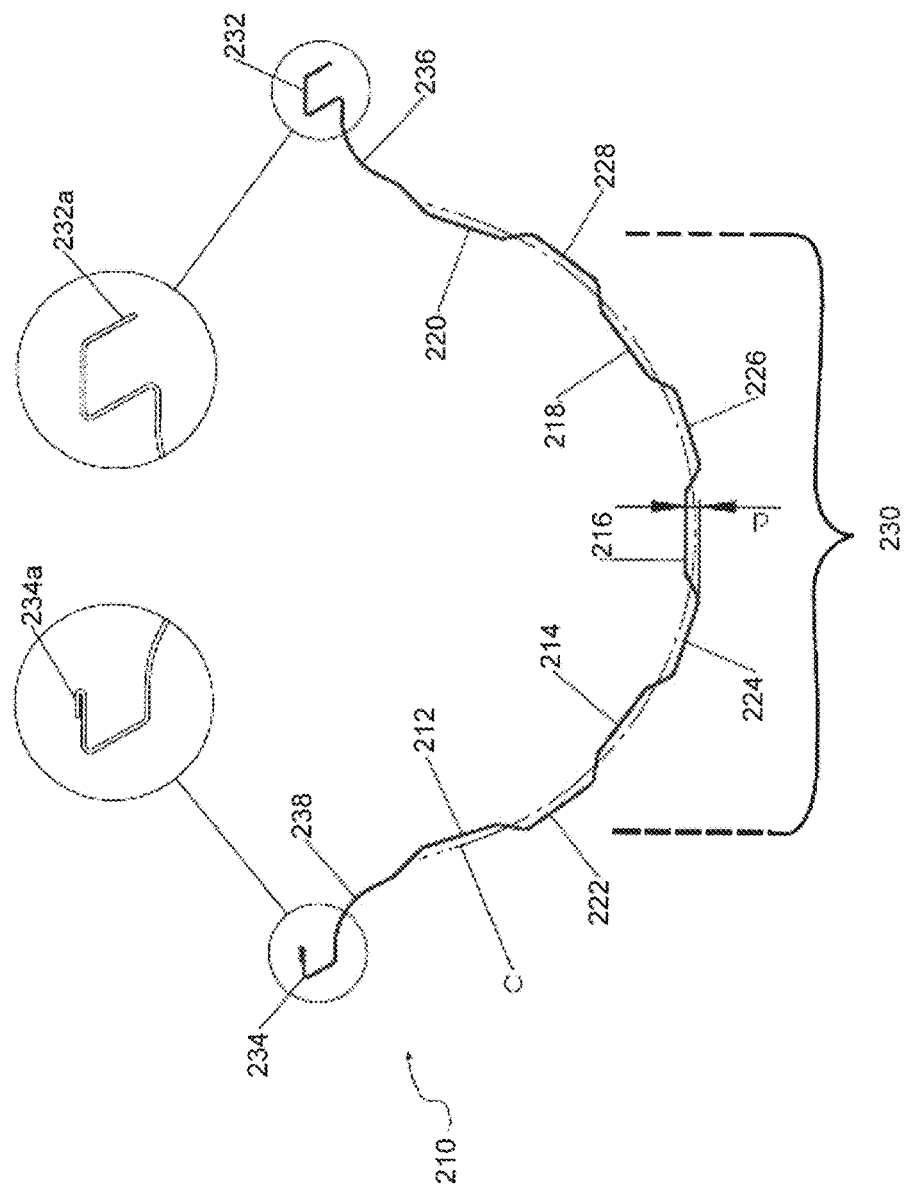
FIGS. 13A-13D illustrate cross-sectional shapes of exemplary building panels that can be formed using systems such as shown in FIG. 4 and FIG. 11.

Referring to FIG. 13A, the exemplary building panel 210 includes, in cross section, a curved center portion 230, curved side portions 236 and 238 extending from the curved center portion 230, and a pair of connecting portions 232 and 234, extending from the side portions 236 and 238 respectively. The overall outline of the curved center portion 230 is illustrated by the curved dotted line C. Connecting portion 232 may include a hook portion 232a, and connecting portion 234 may include a hem portion 234a, the hook portion 232a and the hem portion 234a being complementary in shape for joining the building panel to adjacent building panels. The exemplary building panel 210 also includes a plurality of segments 212, 214, 216, 218, 220, 222, 224, 226 and 228. These segments extend in the longitudinal direction L along the length of the building panel 210. These segments may also be referred to as longitudinal deformations, longitudinal ribs, stiffening ribs, stiffening notches, and the like, and serve to strengthen the building panel 210 against buckling and bending under loads. In this example, segments 222, 224, 226 and 228 extend outwardly in cross-section and segments 212, 214, 216, 218 and 220 extend inwardly in cross-section. As used herein "inward" means closer to a geometric center of the cross-section of a building panel, and "outward" means further from the geometric center of the cross-section of a building panel. As shown in FIG. 13A, adjacent segments extend in opposing directions. For example, segment 212 extends inwardly whereas in adjacent segment 222 extends outwardly. The depth, in cross section, of a given segment relative to the adjacent segment is a depth d. The depths of a segment of the building panel may all be the same, or the depths of the segments may differ from one another. As disclosed in U.S. Patent Application Publication No. 2010/0146789, this type of panel may be curved in the longitudinal direction without using transverse corrugations to accommodate the longitudinal curve.

Figure 13B:
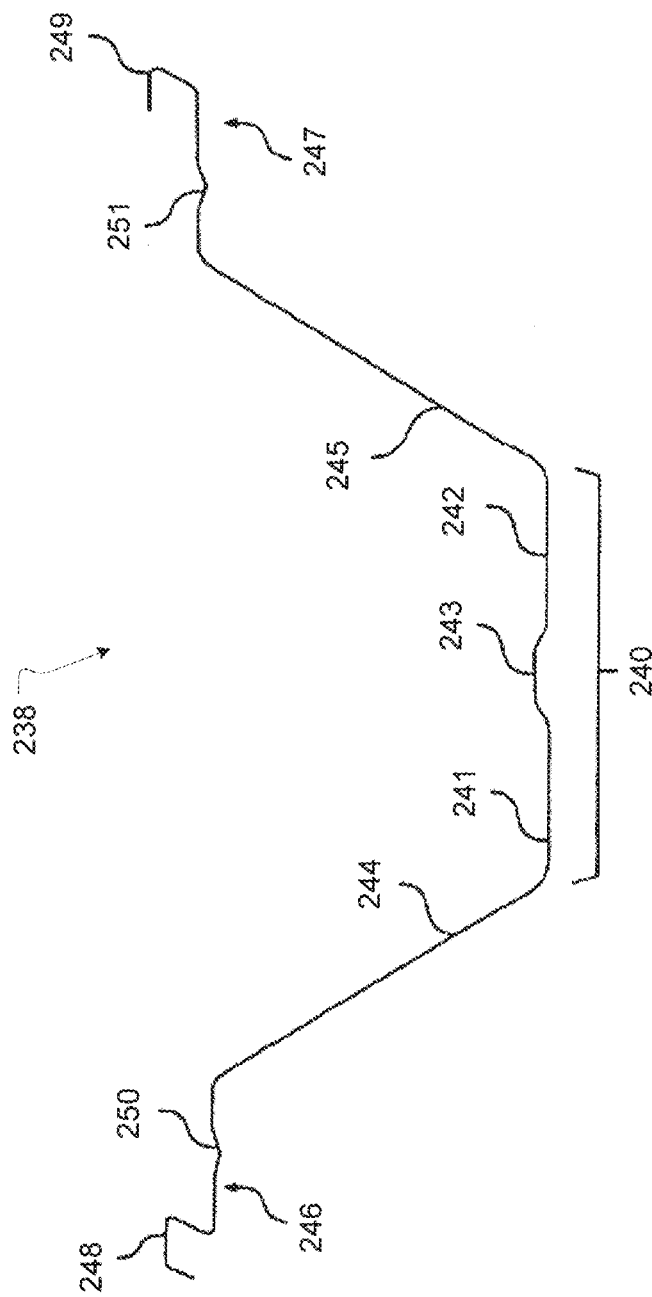

FIG. 13B is a cross-sectional view of another exemplary building panel. The exemplary building panel 238 includes a central portion 240, and two inclined sidewall portions 244 and 245 extending from opposite ends of the central portion 240. The central portion 240 is straight and in order to increase that portion's stiffness it may include one or more longitudinal ribs 243. Assuming the central portion includes a notched stiffener or longitudinal rib, the central portion 230 would be separated into two sub-central portions 241 and 242. The building panel 238 further includes two wing portions 246 and 247 extending from the inclined sidewall portion 244 and 245 respectively. The wing portions 246 and 247 are substantially parallel to the straight central portion 240 and may include notch stiffeners 250 and 251. A hook portion 248, extends from one wing portion 246, and a complementary hem portion 249 extends from the other wing portion 247, which provide a mechanism for connecting multiple panels together side-by-side. The center portion 240 and the side portions 244 and 245 may include transverse corrugations therein to facilitate curving the panel in the longitudinal direction.

Figure 13C:
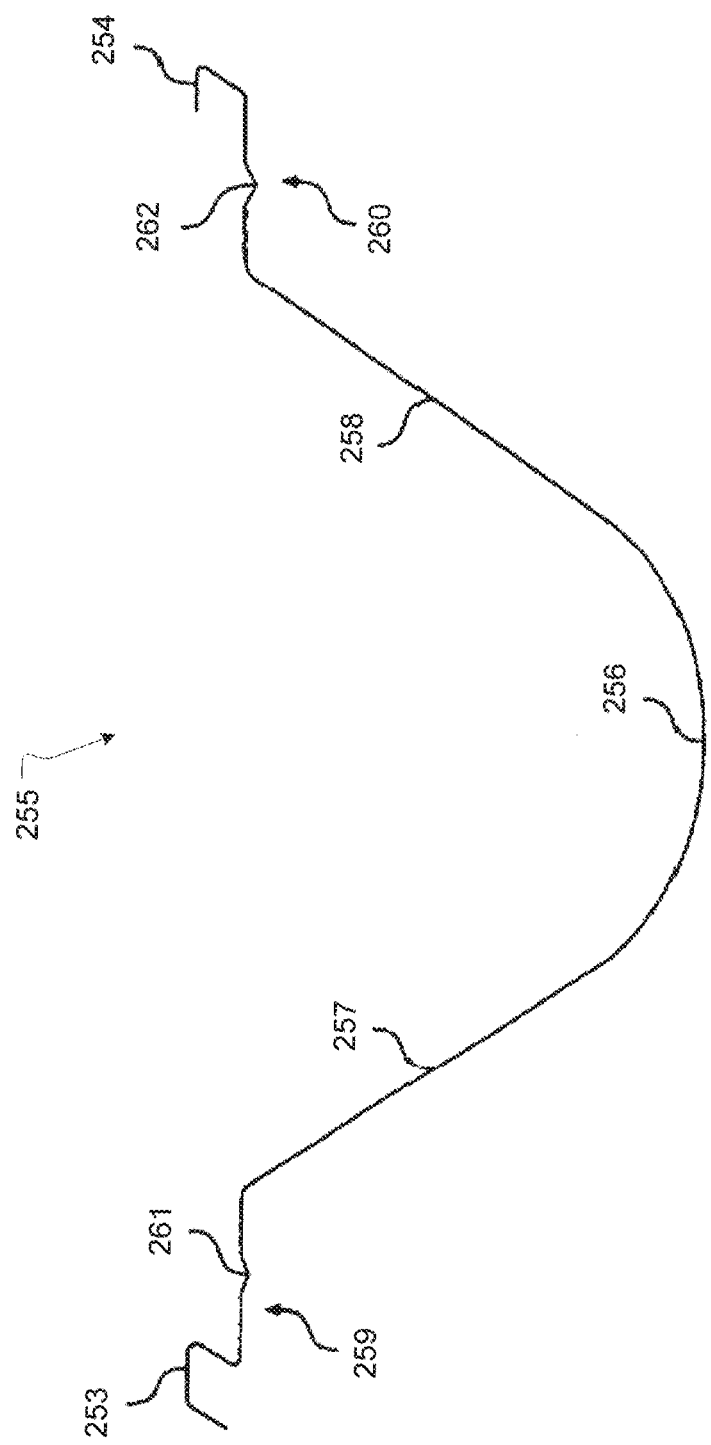

FIG. 13C is a cross-sectional view of another exemplary building panel that may be used with certain exemplary embodiment described herein. The exemplary building panel 255 comprises a curved central portion 256 from the ends of which extend a pair of outwardly diverging inclined sidewall portions 257 and 258. The panel 255 also comprises two wing portions 259 and 260, which extend from the inclined sidewall portions 257 and 258, respectively. Stiffening notches 261 and 262 may be placed within the wing portions 269 and 260 to increase the stiffness of those portions. A hem portion 254 is positioned at the end of one wing portion 260, and a complementary hook portion 253 capable of receiving the hem portion 254 is positioned at the end of the other wing portion 259. The center portion 256 and the side portions 257 and 258 may include transverse corrugations therein to facilitate curving the panel in the longitudinal direction.

Figure 13D:
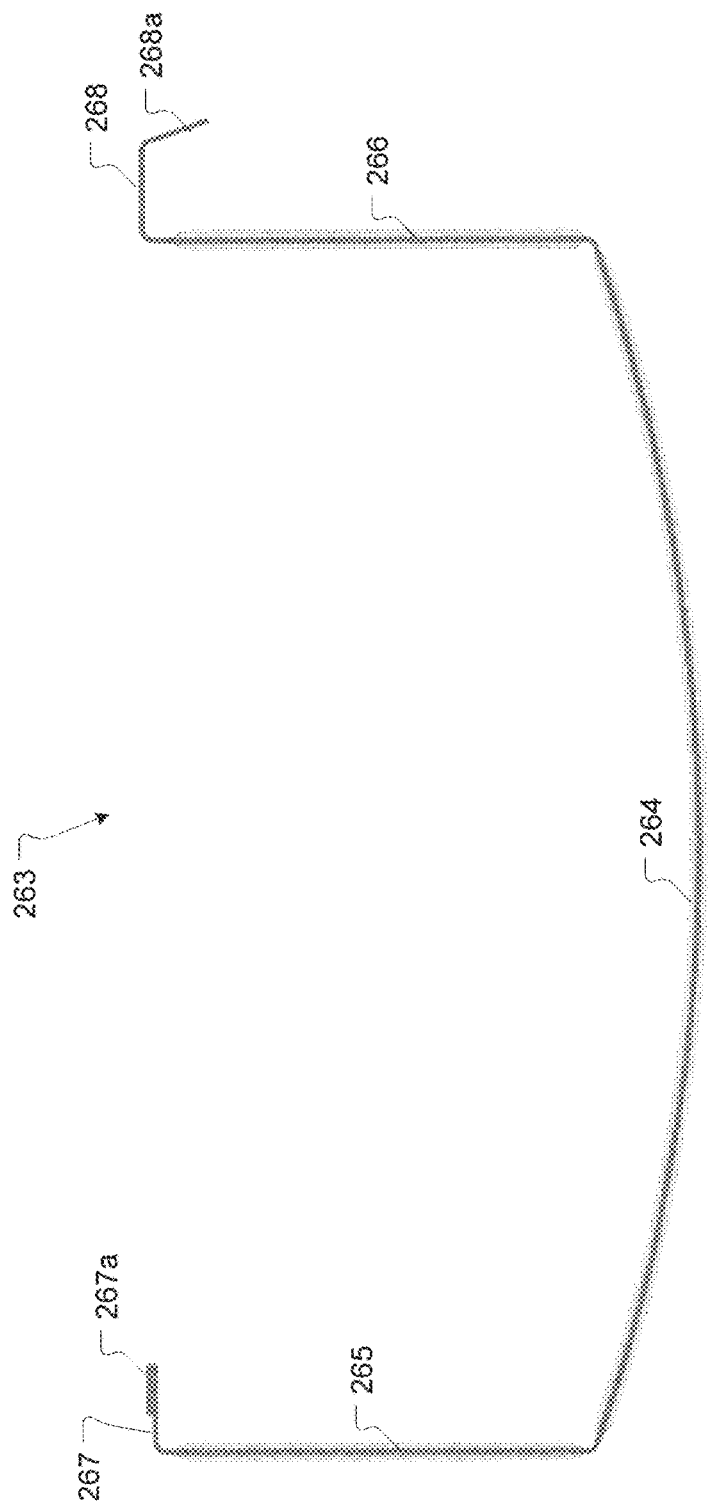

FIG. 13D is a cross-sectional view of another exemplary building panel that may be used with certain exemplary embodiment described herein. The exemplary building panel 263 has, in cross section, a convex base 264, a pair of spaced upright side portions 265 and 266 projecting upwardly from the opposite edges of the base 264 in a direction transverse to the convex base 264, an upper flange portion 267 projecting inwardly from an upper edge of the side portion 265, and a complementary upper flange portion 268 that projects outwardly from an upper edge of the side portion 266. The flange portion 267 has a terminal section 627a bent toward the side portion 265 to provide a reverse bend or fold and a double thickness. The complementary flange portion 268 is bent downwardly to provide a straight, downturned terminal portion 268a providing an inverted, generally U-shaped connecting channel with a bottom opening configured to receive and connect to the flange portion 267 of an adjacent panel. The base 264 and the side portions 265 and 266 may include transverse corrugations therein to facilitate curving the panel in the longitudinal direction.

Those skilled in the art will appreciate that forming sheet material (e.g., sheet metal) into a panel of a desired cross-sectional shape and/or curving such panels, such as described above, can require applying substantial bending forces to the sheet material being processed. The application of these bending forces places loads on the drive systems (e.g., hydraulics) and power sources (e.g., diesel engines) of the panel forming and/or panel curving apparatuses. When processing panels of thicker steel or curving panels at greater curvatures, relatively greater loads are placed on the drive systems and power sources of such panel forming apparatuses and panel curving apparatuses. Simply stated, the apparatuses must work harder when processing thicker steel or curving panels to a greater extent. In addition, the present inventors have observed that drive systems (such as hydraulics) and power systems (such as diesel engines) may operate less efficiently or become more subject to failure under extreme environmental conditions, such as extremely hot and humid weather. The present inventors have observed, as a result, that the maximum speed at which a panel may be processed for shaping (e.g., forming in cross section or curving longitudinally) may depend upon not only the thickness of the sheet material (e.g., steel sheet metal) but also the environmental conditions at hand, both of which may change over the duration of a given project, e.g., daily or even hourly. In an attempt to respond to changes in steel thickness and/or environmental conditions, various parameters of a panel forming apparatus or a panel curving apparatus can be manually readjusted (e.g., manually adjusting hydraulic pressure and/or flow rate to set an optimum speed for shaping a panel), but the present inventors have observed that making such manual readjustments can be tedious and inefficient, and if not done properly can even lead to equipment breakage and failure.

Accordingly, exemplary approaches for adaptively controlling the shaping of a panel made from sheet material (e.g., forming the flat sheet material into a panel of a desired cross-sectional shape, and/or curving a thus formed panel into a desired arched shape) will now be described. These approaches involve the use of sensors, transducers or actuators, and computer logic to control the forming speed of machine for shaping sheet material. The adaptive control allows the operator to set main desired parameters such as panel length or curve radius, for instance, and the shaping machine can adjust itself to the most economical and powerful setting that will allow the fastest production, without overloading the power source. An advantage of this adaptive control is that it can automatically compensates for changes in climate and material thickness so as to still maintain optimal processing speeds. For example, to process relatively thicker steel sheet, more driving force and lower panel speed is required. Also, as ambient temperature rises significantly, the power source may produce less power, and hydraulic fluid viscosity will decrease; therefore, lower panel speed is required. It should be appreciated that the exemplary approaches and systems described herein apply not only to forming or curving structural building panels of the type that can serve as load-bearing wall portions or roof portions of self-supporting buildings, but also apply more generally to the shaping (forming and/or curving) of sheet material, e.g., sheet metal, for use in other applications as well.

Figure 14A:
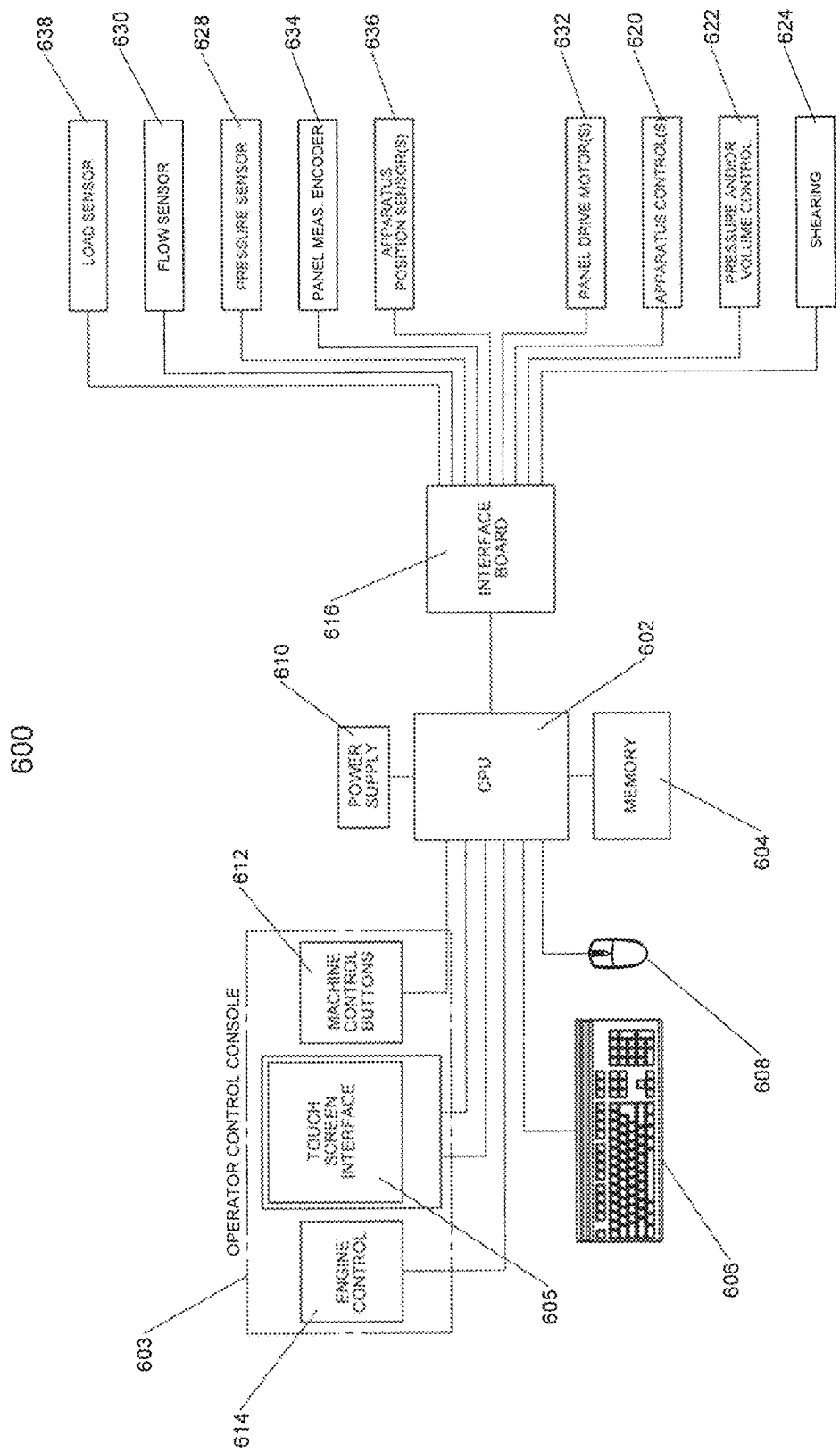
FIG. 14A illustrates an exemplary control system relative to other aspects of a panel curving system according to an exemplary aspect.

Adaptive control of a panel shaping operation according to the present disclosure can be implemented, for example, using a control system such as the exemplary control system 600 shown in FIG. 14A, which may also correspond to control system 62 shown in the example of FIG. 4. In exemplary embodiments, the control system utilizes a closed-loop feedback system configured to continually monitor the panel speed and the load placed upon the power source using speed and load sensors, and based on signals from those sensors, to control the drive system so as to not exceed the desired load at which power source should operate while attempting to achieve a maximum or target speed. The control system 600 can be implemented with any suitable processing system, such as one or more microprocessor-based central processing units, such as (CPU) 602, coupled to a memory 604. The processing system, e.g., CPU 602, can be suitably programmed using any suitable programming language such as C, C++, JAVA, Perl, and the like, to receive sensor signals and generate control signals for carrying out the approaches described herein. The processing system and its functionality can be implemented using any suitable combination of hardware, software and firmware, the choice of which is within the purview of one of ordinary skill in the art.

In addition, programming instructions adapted to cause a processing system to carry out the methods described herein may be stored on or in any suitable non-transitory computer readable storage medium. The non-transitory computer readable storage medium can be any suitable non-transitory physical storage medium for storing such instructions, such as but not limited to a hard disk, floppy disk, compact disk (CD), digital versatile disk (DVD), magnetic tape, other magnetic or optical storage medium, random access memory (RAM), read only memory (ROM), flash memory, etc.

Referring again to FIG. 14A, a user can interact with the control system 600 via input/output (I/O) devices that may be collectively referred to herein as a man-machine interface or operator control console 603. These I/O devices can include, for example, a touch screen display interface 605, a keyboard 606, and a mouse 608. The CPU 602 is also connected to a CPU power supply 610.

The CPU 602 is attached via a bus, for example a Serial Peripheral Interface (SPI) bus, to an interface board 616. The interface board 616 includes peripheral interface components such as analog-to-digital and digital-to-analog converters for sending outputs to and receiving inputs from various other aspects of a panel curving system. The interface board 616 may be, for example, a simple I/O controller driven by the CPU 602 or a stand-alone microcontroller in communication with the CPU 602 that includes its own onboard CPU and memory. The interface board 616 communicates with a machine control interface 612, for example, as described below in connection with FIG. 14B, to receive various inputs. In addition, the interface board 616 communicates with an engine control interface 614 that controls the power source 58 of FIG. 4 or power source 158 of FIG. 11 (e.g., a diesel engine). The interface board 616 drives various output devices and receives input signals from sensors and devices. The interface board 616 may drive solenoid valves which in turn operate actuators (e.g., hydraulic actuators, rotary actuators or other actuating mechanisms) for controlling various aspects of a panel shaping apparatus 620 (e.g., positioning rollers of a panel forming apparatus in a desired arrangement and/or driving such rollers, or positioning of roller arrangements of a panel curving apparatus in a desired arrangement and/or driving such rollers), controlling panel shearing 624, and controlling a panel drive motor 632 (e.g., by controlling hydraulic fluid flow to a hydraulic motor). The interface board can also control the drive system for adjusting the load on the power source by controlling hydraulic fluid volume flow or pressure 622.

Various sensors may be used to feed desired signals back to the interface board 616 to be processed by the processing system, e.g., CPU 602. A panel speed/measurement encoder 634 can generate a signal indicative of the speed of the panel and indicative of the length of the panel that has been processed (or panel speed and panel length processed could be monitored with separate sensors). A load sensor 638 (e.g., a tachometer or alternator with frequency-to-voltage signal conditioner for providing a signal indicative of a rotational speed of a motor shaft, a flow sensor for measuring flow rate of hydraulic fluid, or an ammeter for measuring input current to an electric motor) can generate a signal indicative of the load being placed upon the power source (58/158) during operation and processing of a panel. It can be useful to slow down the speed of the panel in a shaping operation, for instance, when the end of the panel is nearing the output of a shaping apparatus so that the processed panel can be more safely and easily removed from the apparatus. The position of the end of the panel can be monitored with a suitable encoder that monitors the length of panel already processed or with a suitable end of panel sensor (e.g., a rotary-wheel switch that switches states when the wheel no longer rides against a panel). A hydraulic fluid pressure sensor 628 can be used for generating a signal indicative of hydraulic fluid pressure. Monitoring hydraulic pressure can be desirable from a safety standpoint so that the hydraulic pressure can be maintained within a safe range. For instance, if the pressure sensor 628 detects a pressure that exceeds a designated limit or threshold, a warning indicator or alarm can be presented to an operator via interface 605, and the overall hydraulic system pressure can be automatically reduced by controlling a main pressure valve, e.g., in connection with a shutdown sequence. A hydraulic fluid flow sensor 630 can generate a signal indicative of the flow rate of the hydraulic fluid. As noted previously, flow rate of a hydraulic fluid can, in some instances, also be used as a load parameter indicative of the load being placed on the power source according to the present disclosure. One or more apparatus position sensors 636 can be used to generate signals indicative of the position and/or orientation of various shaping assemblies, such as for example, curving assemblies 102, 104 and 106 illustrated in FIG. 4. The values of these various signals may be displayed on the operator control console 603 to keep the operator of the machine appraised of the current status of panel shaping process.

Figure 14B:
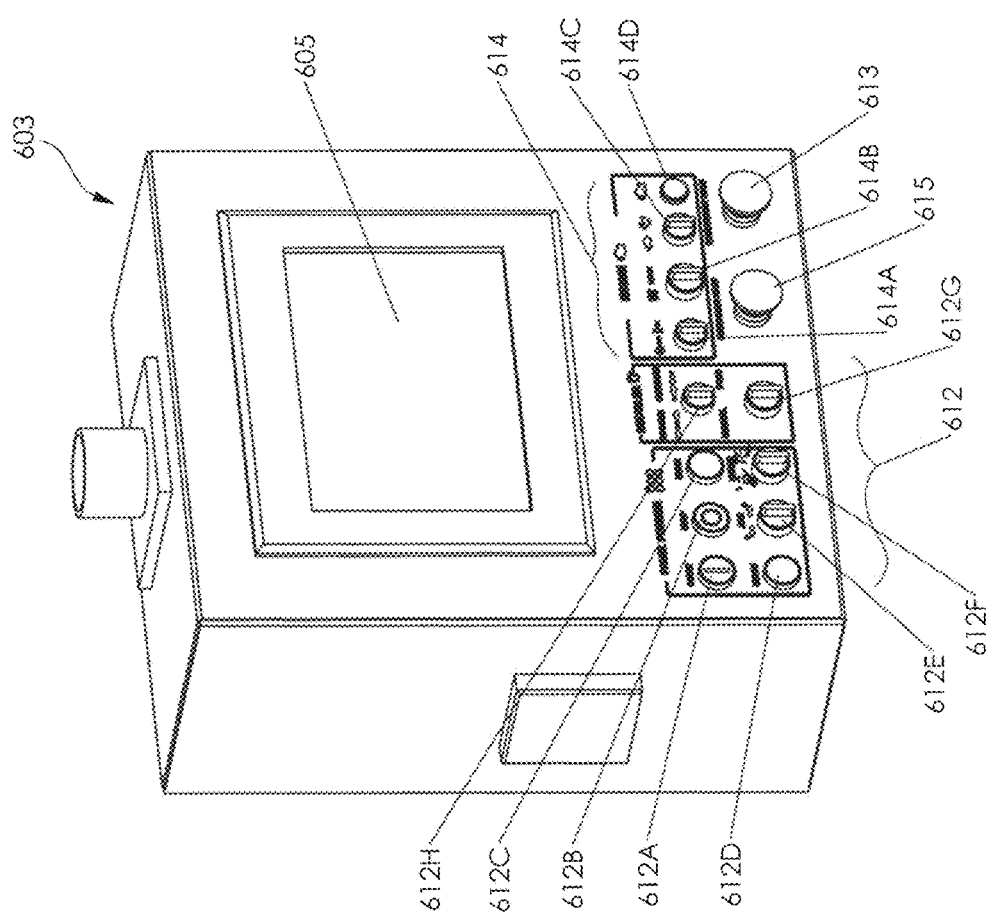
FIG. 14B illustrates an exemplary operator interface console of a control system according to an exemplary aspect.

FIG. 14B illustrates an exemplary operator interface console 603 of the control system 600 including a machine control interface 612 and an engine control interface 614 according to an exemplary aspect. The touch screen 605 can include a pop-up numeric keypad for entering data and pop-up selection keys, e.g., various soft push buttons, for specifying various functions such as, for example, "PANEL LENGTH" to input the desired building panel length, "PANEL RADIUS" to input the desired building panel radius of curvature, "PANEL SPEED" to select from a low-speed setting or a high-speed setting, and "THICKNESS" to input the thickness of the sheet material being processed, for instance. The exemplary engine control interface 614 can include an ignition switch 614A for powering the electronics for enabling or stopping the power source 58 (or 158), a start switch 614B for starting the power source 58, an engine speed control switch 614C for setting the power source 58 to run at a slow (e.g., idle) speed or to run at a fast (e.g., operation) speed, and an indicator light 614D that lights up when the ignition switch 614A is turned on. The machine control interface 612 can include a start switch 612A for commencing a panel shaping process, a stop switch 612B for stopping the panel shaping process, a curve switch 612C for initiating a curving process (in a case where shaping involves longitudinal curving), a reset switch 612D for restarting various automatic processes, a jog switch 612E for jogging the panel forward or backward in the panel shaping machine, and a shear switch 612F for manually shearing the panel when desired. The machine control interface can also include control switches for controlling a coil holder (or decoiler) 54, including, for instance, a switch 612G for switching the orientation of the coil holder 54 from a "folded" or "retracted" (non-use) position for traveling to a "normal" (use) position, and a switch 612H for expanding or contracting an expandable mandrel that fits inside the hollow core of the coil 56 of sheet material so as to secure the coil 56 of sheet material on the coil holder 54 or to release the coil 56 from the coil holder 54. The console 603 can also include an emergency stop switch 613 for quickly stopping the panel shaping process and shutting down the power supply 58 (or 158) in case of emergencies and a drive system stop switch 615 (e.g., a main hydraulics stop switch if a hydraulic drive system is being used) for halting the drive system while permitting the power source 58 to remain running.

Figure 15:
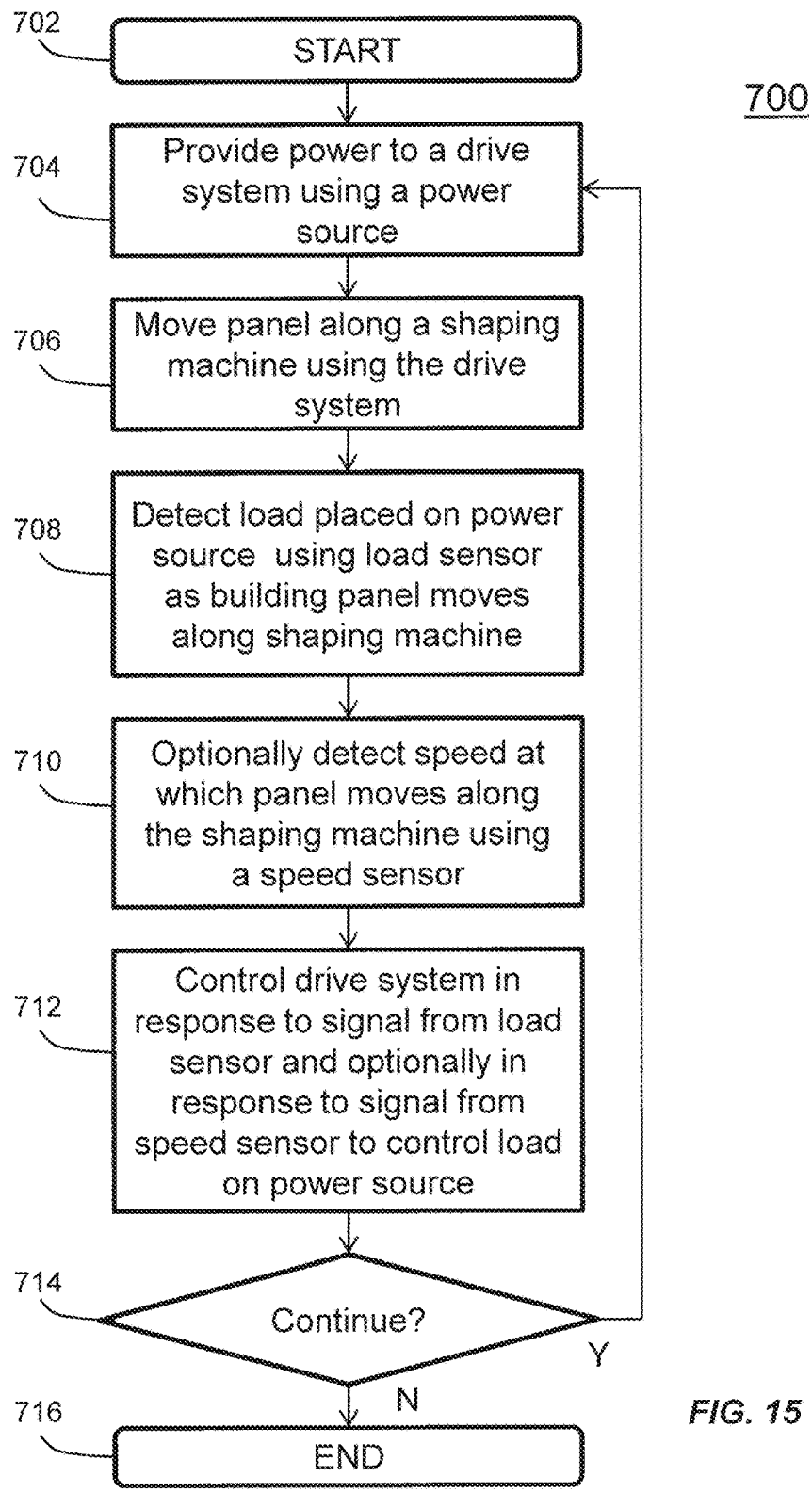
FIG. 15 illustrates a flow chart for an exemplary approach for making a panel of a desired shape according to one example.

FIG. 15 illustrates a flow chart for an exemplary approach 700 for making a panel of a desired shape according to one example. The approach 700 illustrates an exemplary process for a given building panel, and would be carried out for each panel being shaped according to this example. The approach 700 will be described in the context of the exemplary system 50 shown in FIGS. 4 and 14A, but the approach 700 is also applicable to the example of FIG. 11 and is generally applicable to other shaping systems for shaping sheet material. The method starts at step 702, and at step 704 power is provided to drive system (e.g., a hydraulic drive system including hydraulic pumps, hydraulic motors, etc.) by a power source, such as power source 58 as discussed previously herein in connection with FIG. 4. The power source is initially adjusted to nominally run at a desired operating speed, e.g., 2500 revolutions per minute (RPM) for instance for a diesel engine under control of a governor, such as conventionally known to those of ordinary skill in the art. At step 704 the drive system (e.g., including urethane coated drive rollers that grip the panel) is engaged to move the panel along a panel shaping machine, such as a panel forming apparatus 60 or a panel curving apparatus 100 such as described previously in connection with FIG. 4. In this regard, the drive system can be engaged so as to cause panel drive motor 632 to run at a speed that nominally corresponds to a target panel speed prior to inserting a panel into the shaping machine (e.g., 60 or 100), or the drive system can be engaged after a panel (or sheet material from a coil) has been inserted into the shaping machine so as to cause the panel drive motor 632 to initially operate at a speed lower than the target panel speed, and to then ramp up the speed of the panel drive motor 632 gradually to approach the target panel speed.

At step 708, the load placed on the power source 58 is detected using a load sensor 638 as the panel moves along the shaping machine (e.g., 60 and/or 100), i.e., as the panel is processed during a shaping operation. The load sensor 638 can be, for example, a tachometer or alternator with a frequency-to-voltage signal conditioner for generating a signal indicative of engine speed in revolutions per unit time (e.g., revolutions per minute—RPM). Alternatively, in some examples, the load sensor can be an ammeter for monitoring input current to an electric motor (where an electric motor and a generator form the power source 58), or the load sensor can be a flow-rate sensor 630 for hydraulic fluid, such as described previously herein in connection with the examples of FIGS. 4, 6 and 14A. Both a flow rate sensor 630 and a load sensor 638 are illustrated in FIG. 14A since it can be desirable, in some examples, to monitor hydraulic fluid flow rate to provide the operator with more complete system information even if the flow sensor is not being used as the load sensor. The present inventors have found that using a tachometer or alternator with a frequency-to-voltage signal conditioner (or other rotation type sensor) as the load sensor for detecting the rotational speed of a motor shaft is advantageous.

Optionally, at step 710, a speed at which the panel moves along the shaping machine can be detected using a speed sensor, such as speed sensor 20, as previously described in connection with the examples of FIGS. 4 and 5. The speed sensor can generate a signal indicative of the linear speed at which the panel moves along the shaping machine as the panel is being processed. In this regard, it should be understood that detecting the speed of the panel does not necessarily mean that an actual speed value must be generated in units of length per unit time. Rather, to detect panel speed, it is sufficient to generate a signal, e.g., a voltage signal, with the speed sensor that is indicative of speed, e.g., proportional to or correlated to speed via any suitable calibration or correlation.

At step 712, the drive system is controlled in response to signals from the load sensor, and optionally from the speed sensor, to control the load on the power source 58 (e.g., to reduce the load on the power source by reducing the speed of the panel) as the panel moves along the shaping machine during processing of the panel. For example, the drive system can be controlled in this regard using a processing system such as CPU 602 previously described in connection with control system 600 illustrated in FIG. 14A. As will be described further below, such control can be carried out by adjusting a drive parameter as needed to control the load on the power source 58. As a general matter, the drive parameter is a parameter associated with an aspect of the drive system that affects the transfer of power from the power source 58 to the drive system. As will be described further below, exemplary drive parameters can include hydraulic fluid pressure (e.g., in the case of a drive system that utilizes variable pressure hydraulics), hydraulic fluid flow rate (e.g., in the case of a drive system that utilizes constant pressure hydraulics), or a gear ratio (e.g., in the case of a drive system that uses a mechanical transmission having different gear ratios such as with multiple gears). Of course, the drive parameter is not limited to these examples.

The control of the drive system referred to at step 712 can be carried out in a variety of ways depending upon the system configuration at hand. In various examples, the CPU 602 can control the drive system to reduce the load on the power source 58 if the load on the power source exceeds a target (desired) level so as to prevent the power source 58 from becoming overloaded or stalling. In one example, the power source 58 can be a diesel engine (or an electric motor powered by a generator), the load sensor can be a tachometer or alternator with a frequency-to-voltage signal conditioner (in which case the load parameter can be the rotational speed of a motor shaft), the drive system can include variable pressure hydraulics to drive a hydraulic motor 632, and the drive parameter can be hydraulic fluid pressure. The CPU 602 can control the drive system by initially increasing the hydraulic fluid pressure to a hydraulic panel drive motor 632 to gradually ramp up the panel speed, while monitoring the load on the power source 58 by monitoring the rotational speed of a motor shaft. The panel speed can be increased by increasing the hydraulic fluid pressure until the target panel speed is achieved or until a desired load on the power source is achieved, i.e., until the load parameter reaches a target value. For example, the hydraulic fluid pressure can be increased until the rotational speed (load parameter) of a motor shaft drops from a no-load value (e.g., 2500 RPM—determined when a panel was not being processed) by some predetermined amount (e.g., drops by 200 RPM to 2300 RPM). In this example, the target value of the load parameter would be 2500 RPM−200 RPM=2300 RPM. When the target value of the load parameter has been achieved (e.g., the rotational speed has dropped from the no-load value by a predetermined amount such as 200 RPM), the hydraulic fluid pressure is not increased further. At that point, the processing system (e.g., CPU 602) may control the system 50 so as to maintain the value of the load parameter at or slightly above its target value, e.g., 2300 RPM. If, during operation, the power source experiences too great a load, e.g., the engine speed drops below the target value (e.g., 2300 RPM in this example), the drive parameter can be further changed by a suitable amount (e.g., according to a predetermined step size), e.g., the pressure of the hydraulic fluid can be decreased by a step amount (corresponding to a slower panel speed), until the load on the power source is reduced below the target value (e.g., the engine rotational speed returns to above 2300 RPM). For instance, the hydraulic fluid pressure can be changed by an increment (step amount) that is known from trial and error testing to increase the engine RPM under typical circumstances by 5, 10, 15, 20 or 30 RPM. In this way, the processing system (e.g., CPU 602) controls the drive system to reduce the load on the power source 58 if the load on the power source exceeds a desired level. Alternatively, the processing system (e.g., CPU 602) can be configured so as to maintain the load parameter within some target range of permissible values, e.g., within a specified range of the target value, such as ±5 RPM, ±10 RPM, ±15 RPM, ±20 RPM, ±25 RPM, etc., where a rotational speed of a motor shaft is used as the load parameter.

In addition, for example, the processing system can be configured, if desired, to maintain the panel speed within a range encompassing the target panel speed. For instance, the low end of this range could be given by a predetermined percentage (e.g., 85%, 90%, 95%, etc.) of the target speed, and the high end of this range could be given by the target speed itself. Alternatively, the range could be centered about the target speed and have a width that is some percentage of the target speed (e.g., 5%, 10%, etc.) or some other predetermined width value. The processing system can maintain the panel speed in this range subject to suitable control based on the load sensing as described above so as to avoid overloading the power source. For example, if the target speed is 40 feet per minute, the processing system can be configured such that no changes will be made to adjust the panel speed based on speed monitoring as long as the panel speed is within the range of 36 feet/minute (90% of target) to 40 feet/minute (100% of target). In this example, if the panel speed drops below 36 feet per minute, the processing system can adjust the drive system to return the panel speed to the target value, provided that doing so does not overload the power source (as detected by the load sensor and controlled by the processing system such as described above). Such an approach of treating a detected panel speed as permissible if it lies within a specified range of panel speeds has the effect of reducing the number of corrections that may need to be made by the control system to control the panel speed, and this approach can be applied to all of the disclosure set forth herein.

As will be discussed further below, the no-load value for the load parameter can be determined during a baseline run at the beginning of a given production run using the system 50 during a given day. Alternatively, the no-load value for the load parameter can be determined one of ordinary skill in the art during the system design and/or manufacturing process through experience and trial-and-error testing. The predetermined amount of desired load variation can be determined, for example, by trial-and-error testing during the system design and/or manufacturing process for the type of power source and drive system being used, so as to maintain a desired level of output power. The determination of the desired target load on the power source during operation, e.g., the predetermined amount of desired load variation from a baseline (no-load) value, may also be determined from consideration of the horsepower curve or torque curve of a motor (e.g., diesel engine) as the power source, wherein such curves show the output horsepower and torque, respectively, as a function of the rotational speed (e.g., in RPM) of the motor. Horsepower and torque of a motor vary with rotational speed of a motor, and the predetermined amount of load variation should not be so great as to reduce output power of the power source itself by an unacceptable amount, not by more than about 10% from peak power, for example. The present inventors have found that where a diesel engine of about 75-85 horsepower is being used as the power source with a no-load speed of about 2500 RPM (under governor control), a drop in rotational speed by about 200 RPM under load is advantageous and consistent with an efficient use of power.

In another example of controlling the drive system according to step 712, the power source 58 can again be a diesel engine (or an electric motor powered by a generator), and the load sensor can again be a tachometer or alternator with a frequency-to-voltage signal conditioner (in which case the load parameter can be the rotational speed of a motor shaft). In this example, the drive system can include constant pressure hydraulics, and the speed of the hydraulic motor 632 can be adjusted by controlling the flow rate of hydraulic fluid to the motor 632. In this case, the drive parameter can be the hydraulic fluid flow rate. The CPU 602 can control the drive system by initially increasing the hydraulic fluid flow rate to a hydraulic panel drive motor 632 via a suitable valve or valves to gradually ramp up the panel speed, while monitoring the load on the power source 58 by monitoring the rotational speed of a motor shaft. The panel speed can be increased by increasing the hydraulic fluid flow rate until the target panel speed is achieved or until a target load on the power source is achieved, e.g., until the rotational speed of a motor shaft drops from a no-load value (e.g., 2500 RPM) (determined when a panel was not being processed) by some predetermined amount (e.g., drops by 200 RPM to 2300 RPM). When the target load on the power source has been achieved (e.g., the rotational speed has dropped from the no-load value by a predetermined amount such as 200 RPM), the hydraulic fluid flow rate is not increased further. At that point, the processing system (e.g., CPU 602) may control the system 50 so as to maintain the value of the load parameter at or slightly above its target value, e.g., 2300 RPM. If, during operation, the power source experiences too great a load, e.g., the engine speed drops below the target value, the drive parameter can be further changed by a suitable amount according to a predetermined step size, e.g., the pressure of the hydraulic fluid can be decreased by a step amount (corresponding to a slower panel speed), until the load on the power source is reduced below the target value (e.g., the engine rotational speed returns to above 2300 RPM). For instance, the hydraulic fluid flow rate can be decreased by an increment (step amount) that is known from trial and error testing to increase the engine RPM under typical circumstances by 5, 10, 15, 20 or 30 RPM. In this way, the processing system (e.g., CPU 602) controls the drive system to reduce the load on the power source 58 if the load on the power source exceeds a desired level. Alternatively, the processing system (e.g., CPU 602) can be configured so as to maintain the load parameter within some target range of permissible values, e.g., within a specified range of the target value, such as ±5 RPM, ±10 RPM, ±15 RPM, ±20 RPM, ±25 RPM, etc.

In another example of controlling the drive system according to step 712, the power source 58 can again be a diesel engine (or an electric motor powered by a generator), and the load sensor can again be a tachometer or alternator with a frequency-to-voltage signal conditioner (in which case the load parameter can be the rotational speed of a motor shaft). In this example, however, the drive system can include a mechanical transmission that includes multiple gears of various set gear ratios (e.g., a transmission where shifting between gears is electronically controlled with the aid of an automatic clutch) or a continuously variable transmission (CVT), to drive suitable drive rollers (e.g., urethane coated metal rollers) that grip and move the panel longitudinally through the shaping system, where the drive system includes suitable linkages between the transmission and the drive rollers, the transmission being driven by the power source 58. In this example, the rotational speed of the drive rollers can be adjusted by controlling the gear ratio of the transmission (a CVT effectively has an infinite number of gear ratios), and the drive parameter can be the gear ratio. The CPU 602 can control the drive system by initially shifting from lower to higher gears to gradually ramp up the panel speed, while monitoring the load on the power source 58 by monitoring the rotational speed of a motor shaft. The panel speed can be increased by adjusting the gear ratio of the transmission until the target panel speed is achieved or until a target load on the power source is achieved, e.g., until the rotational speed of a motor shaft drops from a no-load value (e.g., 2500 RPM) (determined when a panel was not being processed) by some predetermined amount (e.g., drops by 200 RPM to 2300 RPM). When the target load on the power source has been achieved (e.g., the rotational speed has dropped from the no-load value by a predetermined amount such as 200 RPM), the present gear ratio of the transmission is maintained. If, during operation, the power source experiences too great a load, e.g., the engine speed drops below the target value (e.g., 2300 RPM in this example), the drive parameter will be further changed, e.g., the gear ratio of the transmission can be changed by some specified increment to a lower value (corresponding to a slower panel speed), until the load on the power source is returned to a target value (e.g., 2300 RPM in this example), or suitably close to the target value considering that a transmission-based-drive system may not necessarily have a continuously variable gear ratio. Alternatively, the processing system (e.g., CPU 602) can be configured so as to maintain the load parameter within some target range of permissible values, e.g., within a specified range of the target value, such as ±5 RPM, ±10 RPM, ±15 RPM, ±20 RPM, ±25 RPM, etc.

In yet another example of controlling the drive system according to step 712, the power source 58 can be an electric motor coupled to a source of electricity (e.g., a electrical power line or electric generator), and the load sensor can be an ammeter that measures the input current to the electric motor. The drive system, in this example, can be, for instance, any of the three drive systems described above—a drive system using variable pressure hydraulics, a drive system using constant pressure hydraulics, or a drive system using a mechanical transmission having either fixed gear ratios or continuously variable gear ratios (e.g., a CVT). Depending upon the drive system, the drive parameter can be hydraulic fluid pressure, hydraulic fluid flow rate, or gear ratio, as explained in the examples above. The CPU 602 can control the drive system by initially adjusting the drive parameter to gradually ramp up the panel speed, while monitoring the load on the electric motor (as the power source 58) by monitoring its input current. As known to those skilled in the art, when a load is placed on an electric motor, the input current to the electric motor increases. The panel speed can be increased by adjusting the drive parameter until the target panel speed is achieved or until a target load on the power source is achieved, e.g., until the input current increases up to a target value that is some predetermined percentage of the full-load amperage rating for the electric motor, e.g., 90%, 95%, or some other percentage whose selection is within the purview of one skilled in the art. Those skilled in the art will appreciate that that the full-load amperage rating for an electric motor is generally specified by the manufacturer of the motor, e.g., 172 amperes for at 75 HP motor operating at 230 volts, in which case the target value may be about 95% of 172 amperes or about 163 amperes. When the target load on the power source has been achieved (e.g., the input current has increased to 163 amperes), the drive parameter is not further adjusted at that time. At that point, the processing system (e.g., CPU 602) may control the system 50 so as to maintain the value of the load parameter at or slightly above its target value, e.g., 163 amperes. If, during operation, the power source experiences too great a load, e.g., the input currents increases above the target value, the drive parameter can be further changed by a suitable amount (e.g., according to a predetermined step size), until the input current (load parameter) drops below the target value of 163 amperes. For instance, the drive parameter can be changed by an increment (step amount) that is known from trial and error testing to decrease the engine input current under typical circumstances by 1, 2, 3, 4, 5 amperes (or other amount), for instance. In this way, the processing system (e.g., CPU 602) controls the drive system to reduce the load on the power source 58 if the load on the power source exceeds a desired level. Alternatively, the processing system (e.g., CPU 602) can be configured so as to maintain the load parameter within some target range of permissible values, e.g., within a specified range of the target value, such as ±1 ampere, ±2 amperes, ±3 amperes, ±4 amperes, ±5 amperes etc.

It should be appreciated that control of the drive system at step 712 is not limited to the examples above, and further, that various other combinations of drive parameters and load parameters including and/or in addition to those described above may be used to suitably control the drive system.

At step 714, the CPU determines whether or not to continue shaping the panel. For example, if the CPU detects that a stop condition has occurred, such as whether the drive system stop switch 615 has been engaged, the shaping process ends at step 716 with the drive system being halted. Otherwise, if no stop condition has arisen, the process returns to step 704, with power continuing to be provided to the drive system, and with the remaining steps being executed as described above. The loop may be repeated at any suitable speed. For example, the present inventors have found it advantageous to repeat such loop processing every 50 milliseconds.

Figure 16:
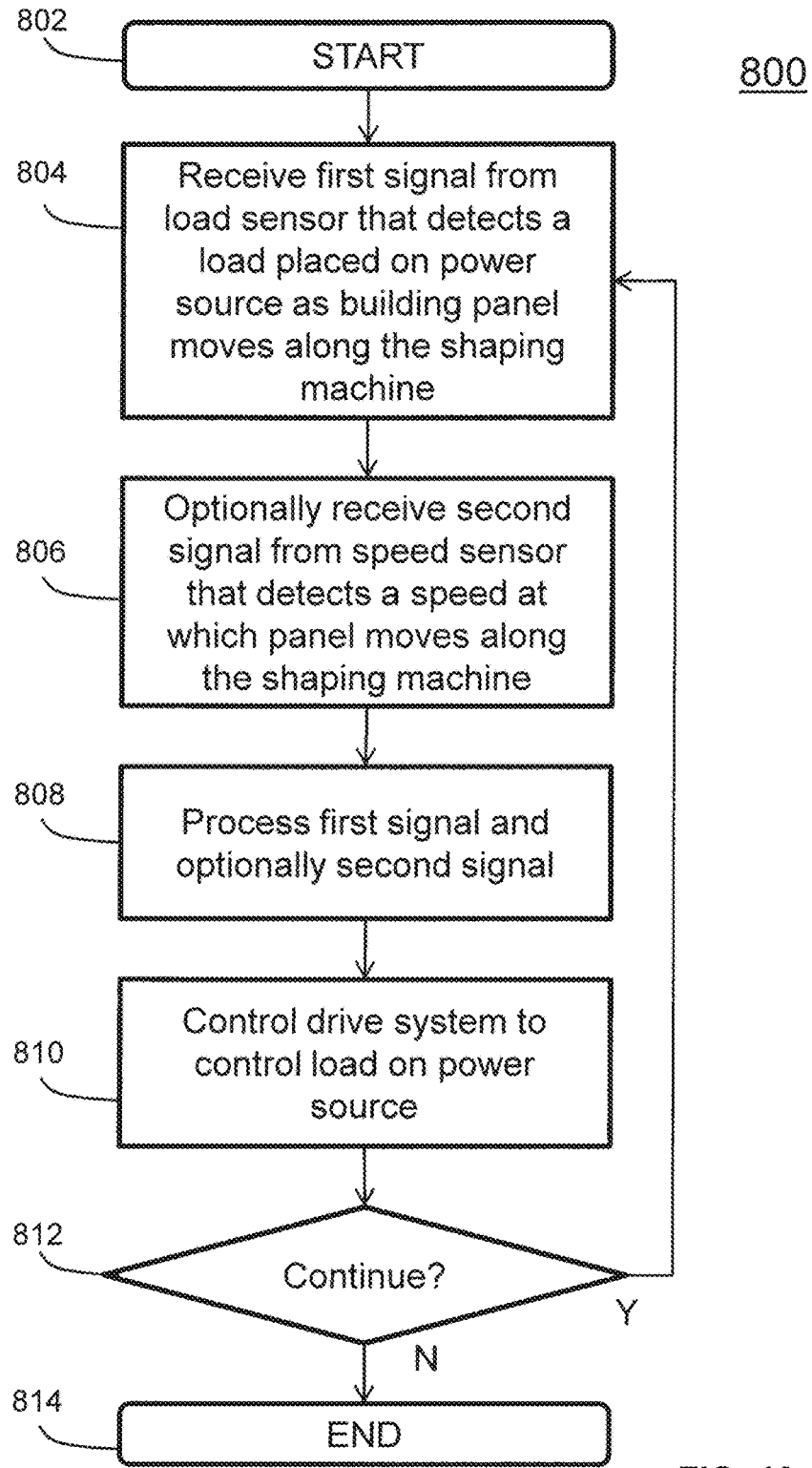
FIG. 16 illustrates a flow chart for an exemplary approach for controlling a system for making a building panel of a desired shape according to one example.

FIG. 16 illustrates a flow chart for an exemplary approach 800 for controlling a system for making a building panel of a desired shape according to another example from the standpoint of the operation of a processing system, such as CPU 602 in the context of control system 600 of FIG. 14A. The approach 800 relates to an exemplary process for a given building panel, and would be carried out for each panel being shaped according to this example. The approach 800 will be described in the context of the exemplary system 50 shown in FIG. 4, but the approach 800 is also applicable to the example of FIG. 11 and is generally applicable to other shaping systems for shaping sheet material.

The process starts at step 802, and at step 804, CPU 602 receives a first signal from a load sensor (e.g., load sensor 30), such as described above, wherein the load sensor detects a load placed on the power source 58, e.g., a diesel engine, as the panel moves along the shaping machine (e.g., 60 and/or 100), i.e., as the panel is processed during a shaping operation. The first signal is indicative of the load placed on the power source and can be, for example, a signal indicative of rotational speed of a motor shaft, a signal indicative of the flow rate of hydraulic fluid, or a signal indicative of the input current to an electric motor, such as described above. At step 806, CPU 602 optionally receives a second signal from a speed sensor (e.g., speed sensor 20) that detects a speed at which the panel moves along the shaping machine. The second signal is indicative of the linear speed of the panel as it moves along the shaping machine during a shaping operation. At step 808 CPU 602 processes the first signal and may also process the optional second signal to generate a control signal in response to the first signal and optionally in response to the second signal. At step 810 CPU 602 controls the drive system, e.g., sends the control signal to the drive system (e.g., via an interface board 616) so as to control the load on the power source 58, which has the effect of controlling the speed at which the panel moves along the shaping machine.

In this regard, the control signal generated at step 808 can be generated based upon suitable computer logic such described above in connection with FIG. 15. For example, the control signal can be generated to engage the drive system so as to initially run at a speed corresponding to the target panel speed prior to inserting a panel into the shaping system or to gradually ramp up to such a speed after a panel has been inserted into the panel shaping system by suitably adjusting a drive parameter such as hydraulic fluid pressure, hydraulic fluid flow rate, or gear ratio of a transmission, e.g., by increasing the hydraulic fluid pressure to a hydraulic panel drive motor 632, or by increasing hydraulic fluid flow rate to the hydraulic panel drive motor 632, or by increasing the gear ratio of a transmission. The load on the power source 58 can also be monitored using a load sensor to monitor a suitable load parameter, e.g., by monitoring rotational speed of a motor shaft, the input current to an electric motor, or the flow rate of hydraulic fluid, as described previously above. The panel speed can be increased until a target panel speed is achieved or until a target load on the power source is achieved, e.g., until the engine rotational speed reaches a target value (e.g., 2300 RPM). If, during operation, the power source experiences too great a load, e.g., the engine rotational speed drops below its target value (e.g., 2300 RPM), the speed of the panel will be decreased until the load on the power source is returned to or slightly above a target value (e.g., 2300 RPM). It will be appreciated that the processing system (e.g., CPU 602) can process signals and execute controls relating to various combinations of drive parameters and load parameters, such as those described above in connection with FIG. 15, or other suitable combinations of drive parameters and load parameters.

After sending the control signal to the drive system to control the load on the power source at step 810, the CPU 602 the CPU determines whether or not to continue shaping the panel at step 812. For example, if the CPU detects that a stop condition has occurred, such as whether the drive system stop switch 615 has been engaged, the shaping process ends at step 814 with the drive system being halted. Otherwise, if no stop condition has arisen, the process returns to step 804, with power continuing to be provided to the drive system, and with the remaining steps being executed as described above. The loop may be repeated at any suitable speed. For example, the present inventors have found it advantageous to repeat such loop processing every 50 milliseconds.

Figure 17:
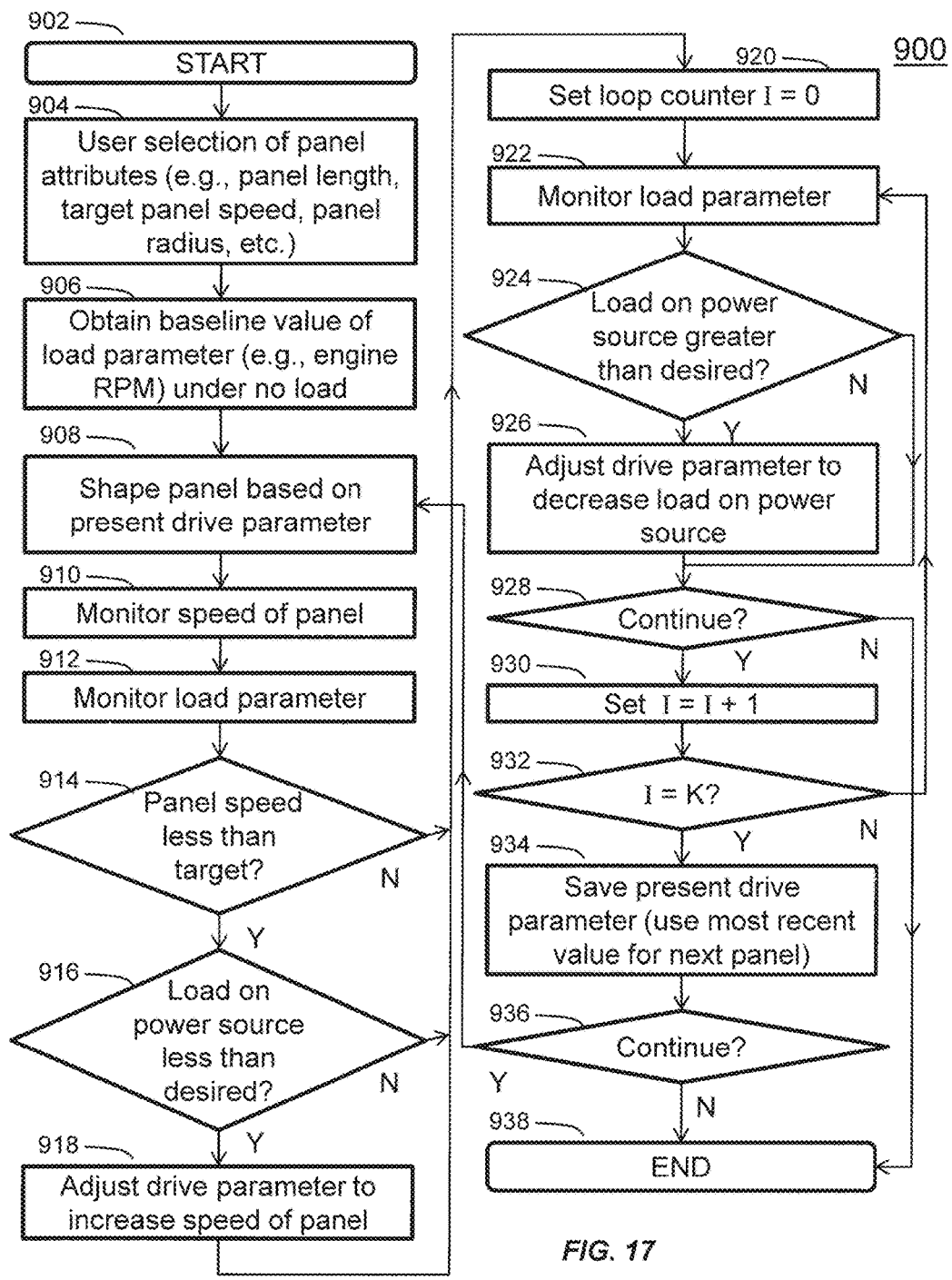
FIG. 17 illustrates a flow chart for an exemplary approach for making a panel of a desired shape according to another example.

FIG. 17 illustrates a flow chart for an exemplary approach 900 or making a panel of a desired shape according to another example. In the approach 900, the first two steps 904 and 906 might be carried out only once at the beginning of project for processing many panels, and the remaining steps 908-936 would be carried out for each panel being shaped according to this example. The approach 900 will be described in the context of the exemplary system 50 shown in FIG. 4, but the approach 900 is also applicable to the example of FIG. 11 and is generally applicable to other shaping systems for shaping sheet material. The process starts at step 902, e.g., with an operator turning an ignition switch to start the power source. The processing system, e.g., CPU 602, initializes and can then do a system diagnostic check to verify that communications with the interface board 616 are working and that all sensors are sending signals and that those signals are within proper start-up ranges considering that panel processing has not yet begun. With the operator console 603 powered up, at step 904 a user can select particular panel attributes, such as panel length, panel radius (in the case of a shaping a panel by curving), target panel speed, etc. This selection can be carried out using an operator control console 603 and touch screen interface 605, such as described in connection with FIGS. 14A and 14B. The target panel speed can selected, for example, by inputting an actual number (within permissible limits), e.g., 40 feet per minute, 50 feet per minute, 60 feet per minute, or by selecting from among various preset settings such as "slow" or "economy," "normal," and "fast," each of which is correlated in memory to a corresponding speed in terms of feet per minute. For example, the "slow" or "economy" setting may correspond to 20 feet per minute, "normal" may correspond to 40 feet per minute, and "fast" may correspond to 60 feet per minute. Of course, these settings could correspond to different numerical speed values, as suitably chosen by the system designer. The interface 605 may warn the user with a warning message at the time of entering parameters if the target panel speed selected or input is outside a permissible range. Moreover, the permissible choices of some parameters may depend on the choices of other parameters. For instance, the console 603 (see FIG. 14A) may warn the operator, upon the operator's attempt to select a desired "fast" panel speed of 60 feet per minute, that such a choice is not permissible based upon the operator's prior choice of a small longitudinal radius of curvature, i.e., since making a highly curved panel at a given thickness of sheet material may need to be done at slower speed. Such decision making by the CPU 602 can be based upon appropriate rules implemented using suitable software instructions, for instance, defined to ensure safe material handling and efficient production.

The operator console 603 and CPU 602 can be configured, if desired, to permit the user to override various functions. For example, the user can choose to enter a panel speed other than the typical recommended speeds, and the system can try to achieve it. If it is determined during operation that there is not enough power available from the power source 58 to achieve that panel speed, as will be discussed further below, then a message can be displayed at the operator console 603 that the system 50 can only process panels at a reduced rate appropriate for the conditions.

At step 906, prior to actually shaping a panel, the system 50 can obtain a "baseline" value of the load parameter under a "no load," condition i.e., when no panel is undergoing a shaping operation. This can be initiated for instance by displaying a message to the operator at the control console 603 to press a soft button to begin system "initialization" or by obtaining the value automatically immediately after the power source 58 is started. As noted previously, in one example, the load parameter can be rotational speed of a motor, e.g., diesel engine, as the power source 58. In that example, the power source 58 will be operating at this stage at its nominal preferred rotation speed under the control of a conventional engine governor, and the nominal preferred rotation speed of the engine may be that of the peak of the horsepower curve or torque curve for that engine, e.g., about 2200-2600 RPM for a diesel engine rated near 75 horsepower. The CPU 602 can record a signal from the load sensor (e.g., sensor 30) as the no-load baseline value for the load parameter, either with or without the drive system engaged, but in any event, while there is no shaping of a panel taking place. Preferably, the drive system is not engaged while obtaining the no-load baseline value of the load parameter. As discussed previously herein, in some examples, the load parameter can alternatively be the flow rate of hydraulic fluid (where a hydraulic system is being used) or the input current to an electric motor (where an electric motor and a generator are used as the power source), and in such cases, the baseline value for the load parameter can likewise be obtained from a suitable load sensor (e.g., a flow-rate sensor or ammeter, respectively). The signal value from the load sensor corresponding to the no-load baseline condition can then be stored by the processing system, e.g., CPU 602, in any suitable memory 604, such as RAM. Where the power source comprises an electric motor and the load parameter is the input current to the electric motor, obtaining a baseline value for the load parameter at step 906 may simply comprise reading the full-load amperage rating of the electric motor from memory 604, that value having been previously stored as a default value.

At step 908, the panel shaping operation is carried out using the present value drive parameter stored in memory 604 after having been begun, e.g., by the user selecting a suitable "start" button (e.g., a hard button or soft-key button on the touch screen 605) at the operator console 603. This can occur in different ways. In one example, the drive system can be engaged before sheet material is inserted into the shaping machine (e.g., 60 or 100), in which case the CPU 602 can send a signal to the interface board 616 to engage the drive system, e.g., including the panel drive motor 632 to run at a speed corresponding to the nominal target panel speed, and the sheet material can then be introduced to the shaping machine. In this example, once the sheet material is introduced to the panel shaping machine, it is possible that the speed of the panel drive motor 632 may drop below its nominal setting due to the load being placed on the power source 58. Alternatively, in another example, the drive system can be engaged after sheet material has been initially inserted into the shaping machine, in which case the CPU 602 can send a signal to the interface board 616 to gradually ramp up the speed of the drive system by incremental amounts. In this latter example, the shaping of the panel initially occurs at lower than target speed. In either case, at step 910 the speed of the panel can be monitored using a speed sensor (e.g., sensor 20), and at step 912 the load on the power source is monitored with a load sensor (e.g., sensor 30), such as described previously herein. The speed sensor (e.g., 20) generates a signal indicative of the panel speed as the panel moves along the shaping machine during a shaping process, and the load sensor (e.g., 30) generates a signal indicative of the load placed on the power source 58 while the panel is being shaped, such as discussed previously herein. These signals are routed back to the CPU 602.

At step 914, the CPU 602 makes a determination as to whether the panel speed is less than the target speed. If the answer is NO at step 914, the process proceeds to step 920 skipping steps 916 and 918. If the answer is YES at step 914, the process proceeds to step 916 where the CPU 602 determines whether the power source is operating under less load than the desired (target) load. This can be determined by comparing the actual value of the load parameter to the target value of the load parameter. As described previously herein, the target value of the load parameter can be determined as a percentage or as an offset from some nominal value, such as an offset from a no-load RPM value (where the load parameter is a engine speed) or such as a percentage of a full-load amperage rating (where the load parameter is input current of an electric motor), for example. If the answer at step 916 is NO, the process skips step 918 and proceeds to step 920. On the other hand, if the answer at step 916 is YES (i.e., the load on the power source 58 is less than some desired target level), then the process proceeds to step 918, and the CPU 602 adjusts the drive parameter by an incremental amount (step amount) to control the drive system (e.g., to increase the speed of the panel drive motor 632) to increase the speed of the panel at step 918. The choice of the incremental amount (step amount) is within the purview of one or ordinary skill in the art based and can be chosen by trial and error testing, for instance, based on whatever timing is chosen for the various loops reflected in FIG. 17 (examples of such timing are discussed further below). In particular, if the loops represented in FIG. 17 are executed relatively quickly, the drive parameter can be incremented by relatively small amounts. If on the other hand, the loops represented in FIG. 17 are executed more slowly, it may be desirable to increment the drive parameter by greater amounts. These choices can be made by one skilled in the art based upon trial and error testing depending upon the drive parameter and the load parameter that are being used. It will be appreciated that one outcome of steps 914-918 is to increase the speed of the panel if the current panel speed is below the target panel speed and if the power source 58 is operating at less than the desired target load.

At step 920 a loop counter variable "I" is initialized to zero. The loop represented by steps 922 through 934 may then be carried out under a loop timer that, for example, completes one such loop in 50 milliseconds. Different loop timing may be chosen, of course, and selection of such timing is within the purview of one of ordinary skill in the art. At step 922 the load parameter is again monitored using the load sensor (e.g., 30) and the CPU 602. At step 924, the processing system, e.g., CPU 602, determines whether the power source 58 is operating under greater load than the desired target load. For example, if the load parameter is engine rotational speed, the CPU 602 can determine whether the engine speed has dropped below a target value of 2300 RPM, or whether the engine speed has dropped below a lower limit of a permissible range of engine speeds (e.g., has dropped below the lower limit of 2275 RPM where the permissible range of engine speeds is 2300±25 RPM). If YES at step 924, e.g., the engine speed has dropped below the target value (or lower limit of the target range), the process proceeds to step 926, and the CPU 602 adjusts the drive parameter by an incremental amount to control the drive system to reduce the load on the power source 58, which also has the effect of decreasing the speed of the panel. The incremental amount by which the drive parameter is adjusted at step 926 can be determined by one of ordinary skill in the art based on trial and error testing depending upon the load parameter and drive parameters being used, such as described previously herein. In addition, the incremental amount (step amount) by which the drive parameter is adjusted at step 926 (to reduce load on the power source 58) may differ from (e.g., may be larger than) the incremental amount (step amount) by which the drive parameter is adjusted at step 918 (to increase the speed of the panel). Moreover, the incremental amount (step amount) by which the drive parameter is changed can be a differentially determined (e.g., by looking up the value from a suitable look-up table stored in memory), meaning that the step amount can be greater for greater deviations in load parameter and smaller for smaller deviations in load parameter. If the answer at step 924 is NO (the power source 58 is not under more load than the desired target load), the process skips step 926 and proceeds to step 928.

At step 928 the CPU 602 determines whether or not to continue the shaping process. For example, if the CPU detects that a stop condition has occurred, such as whether the drive system stop switch 615 has been engaged, the shaping process ends at step 938 with the drive system being halted. Otherwise, if no stop condition has arisen, the process proceeds to step 930, where the loop counter value I is incremented to I=I+1. At step 932, the CPU 602 determines whether the loop counter variable I has reached some predetermined number K, e.g., K=10, 15, 30, 50, 100, or 150 loops, etc. Other values can be chosen for K, the selection of which is within the purview of one or ordinary skill in the art. If the answer at step 932 is NO, the process returns to step 922 and the loop of steps 922-932 repeats. If the answer at step 932 is YES (i.e., a predetermined number of loops has been executed), then the process proceeds to step 934, and the CPU 602 saves the present drive parameter in memory 604, so that this drive parameter can be used to continue processing the panel. Also, when a new panel is inserted into the shaping machine, this present value of the drive parameter can also be used as a starting value for processing the new panel. At step 936, the CPU 602 determines whether or not to continue the shaping process. For example, if the CPU detects that a stop condition has occurred, such as whether the drive system stop switch 615 has been engaged, the shaping process ends at step 938 with the drive system being halted. Otherwise, if no stop condition has arisen, the process returns to step 908 to continue processing the panel using the present value of the drive parameter.

Those skilled in the art will appreciate that in the example of FIG. 17, many (e.g., 10, 15, 30, 50, 100, 150) iterations of the loop 922-932 are carried out for the purpose of testing whether the load on the power source 58 is too high (step 924) and for decreasing that load (and, accordingly, for decreasing the panel speed) before providing another opportunity to increase the panel speed at step 918 by returning to step 908. Stated differently, in the example of FIG. 17, there are more opportunities to decrease panel speed than there are to increase panel speed. This approach can be advantageous since an object described herein is to avoid overloading and possibly stalling or even damaging the power source 58 by unintentionally having placed the power source 58 under too great a load. In that sense, the approach 900 can be viewed as a defensive approach to avoiding overloading and possibly stalling the power source 58. For an example where the loop timing is configured such that each loop over steps 922-932 takes 50 milliseconds, a decision about whether to decrease the load on the power source 58 (and therefore to decrease the panel speed) is made every 50 milliseconds. If the value of K is chosen as K=15, the opportunity to increase panel speed would then arise every 750 milliseconds (i.e., 15×50 milliseconds). Thus, the system can be configured to make determinations of whether to decrease the speed of the building panel at a first rate (e.g., once every 50 milliseconds) and to make determinations of whether to increase the speed of the building panel at a second rate (e.g., once every 750 milliseconds), wherein the first rate is greater than the second rate.

While the present invention has been described in terms of exemplary embodiments, it will be understood by those skilled in the art that various modifications can be made thereto without departing from the scope of the invention as set forth in the claims. For example, the exemplary power sources and power ratings, drive systems, shaping apparatuses, control systems, load sensors, load parameters, types of sheet materials and thicknesses, panel shapes, and control algorithms described herein are intended to be illustrative in nature and non-limiting. Other suitable power sources and power ratings, drive systems, shaping apparatuses, control systems, load sensors, load parameters, types of sheet materials and thicknesses, panel shapes, and control algorithms could be used to implement the inventive approaches described herein and are intended to fall within the scope of the invention as set forth in the claims.

What is claimed is:

1. A system for forming a building panel of a desired shape, the system comprising:
    a panel shaping machine comprising multiple panel forming assemblies, each panel forming assembly comprising multiple rollers supported by frame members, the multiple rollers of the panel forming assemblies being positioned to successively change a shape of a building panel as it passes along the panel shaping machine, the panel shaping machine configured to provide a desired shape to the building panel, the building panel being made from sheet material;
    a drive system comprising a drive motor and a drive roller for moving the building panel longitudinally along the panel shaping machine;
    a power source for providing power to the drive system;
    a load sensor for detecting a load placed on the power source as the building panel is moved along the panel shaping machine; and
    a control system comprising a microprocessor-based controller for controlling the drive system in response to a signal from the load sensor so as to control the load placed on the power source as the panel moves along the panel shaping machine.

2. The system of claim 1, further comprising a speed sensor for detecting a speed of the building panel as the building panel moves along the panel shaping machine, wherein the control system is configured to further control the drive system in response to a signal from the speed sensor.

3. The system of claim 1, wherein the control system controls the drive system to reduce the load on the power source if the load on the power source exceeds a desired level.

4. The system of claim 1, wherein the power source comprises a motor and wherein the load sensor comprises a rotational speed sensor for generating a signal indicative of a rotational speed of the motor.

5. The system of claim 1, wherein the drive system comprises a hydraulic system, and wherein the load sensor comprises a flow-rate sensor for generating a signal indicative of a flow rate of hydraulic fluid.

6. The system of claim 1, wherein the shaping machine comprises a curving apparatus comprising multiple rollers for contacting the building panel and for imparting a longitudinal curve to the building panel.

7. The system of claim 1, wherein the panel shaping machine comprises a panel forming apparatus comprising multiple rollers for contacting the building panel and for imparting a desired cross-sectional shape to the building panel.

8. The system of claim 1, wherein the drive system comprises a hydraulic system, the hydraulic system includes a pressure sensor to generate a signal indicative of the a pressure of hydraulic fluid, and the control system is configured to generate a warning signal if the pressure signal exceeds a predetermined value.

9. The system of claim 2, wherein the control system is configured to make determinations of whether to decrease the speed of the building panel at a first rate and to make determinations of whether to increase the speed of the building panel at a second rate, wherein the first rate is greater than the second rate.

10. The system of claim 2, wherein the control system is configured to control the drive system to increase the speed of the building panel as the panel moves along the panel shaping machine if the speed is less than a target value and if the load on the power source is less than a desired level.

11. A method for shaping a building panel of a desired shape, comprising:
    providing power to a drive system using a power source, the drive system comprising a drive motor and a drive roller;
    moving a building panel longitudinally through a panel shaping machine using the drive system, the panel shaping machine comprising multiple panel forming assemblies, each panel forming assembly comprising multiple rollers supported by frame members, the multiple rollers of the panel forming assemblies being positioned to successively change a shape of a building panel as it passes along the panel shaping machine, the building panel being made from sheet material, the panel shaping machine configured to provide a desired shape to the building panel;
    detecting a load placed on the power source with a load sensor as the building panel moves along the panel shaping machine; and
    controlling the drive system in response to a signal from the load sensor so as to control the load placed on the power source as the panel moves along the panel shaping machine.

12. The method of claim 11, further comprising:
    detecting a speed of the building panel with a speed sensor as the building panel moves along the panel shaping machine; and
    controlling the drive system in response to a signal from the speed sensor.

13. The method of claim 11, wherein controlling the drive system comprises controlling the drive system to reduce the load on the power source if the load on the power source exceeds a desired level.

14. The method of claim 11, wherein detecting the load on the power source comprises detecting a rotational speed of a motor of the power source.

15. The method of claim 11, wherein detecting the load on the power source comprises detecting a flow rate of hydraulic fluid of a hydraulic system coupled to the power source.

16. The method of claim 11, comprising detecting a pressure of hydraulic fluid of a hydraulic system coupled to the power source and generating a warning signal if the pressure exceeds a predetermined value.

17. The method of claim 12, comprising making determinations of whether to decrease the speed of the building panel at a first rate and making determinations of whether to increase the speed of the building panel at a second rate, wherein the first rate is greater than the second rate.

18. The method of claim 12, comprising controlling the drive system to increase the speed of the building panel as the panel moves along the panel shaping machine if the speed is less than a target value and if the load on the power source is less than a desired level.

19. A method for controlling a system for shaping a building panel of a desired shape, the method comprising:
receiving a first signal from a load sensor that detects a load placed on a power source, the power source configured provide power to a drive system, the drive system comprising a drive motor and a drive roller and being configured to move a building panel longitudinally along a panel shaping machine, the panel shaping machine comprising multiple panel forming assemblies, each panel forming assembly comprising multiple rollers supported by frame members, the multiple rollers of the panel forming assemblies being positioned to successively change a shape of a building panel as it passes along the panel shaping machine, the building panel being made from sheet material, the panel shaping machine configured to provide a desired shape to the building panel;
processing the first signal from the load sensor; and
controlling the drive system based on said processing to control the load placed on the power source as the building panel moves along the shaping machine.

20. A control system for controlling a panel shaping machine for shaping a building panel, the control system comprising:
a microprocessor-based central processing unit; and
a memory coupled to the processing system,
wherein the microprocessor-based central processing unit is configured to execute the method of claim 19.

21. An article of manufacture comprising a non-transitory computer-readable medium comprising programming instructions for the control of a system for shaping a building panel of a desired shape, the programming instructions when executed causing a microprocessor-based central processing unit to carry out the method of claim 19.

* * * * *